United States Patent
Dawkins et al.

(10) Patent No.: US 12,204,946 B2
(45) Date of Patent: Jan. 21, 2025

(54) METHOD AND SYSTEM FOR PROVIDING COMPOSABLE INFRASTRUCTURE CAPABILITIES

(71) Applicant: Dell Products L.P., Hopkinton, MA (US)

(72) Inventors: William Price Dawkins, Lakeway, TX (US); Praveen Vishakantaiah, Austin, TX (US); Mark Steven Sanders, Roanoke, VA (US); Gaurav Chawla, Austin, TX (US); John S. Hardwood, Boston, MA (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 889 days.

(21) Appl. No.: 17/160,540

(22) Filed: Jan. 28, 2021

(65) Prior Publication Data
US 2022/0237051 A1    Jul. 28, 2022

(51) Int. Cl.
G06F 9/46     (2006.01)
G06F 9/50     (2006.01)

(52) U.S. Cl.
CPC .......... *G06F 9/5077* (2013.01); *G06F 9/468* (2013.01); *G06F 9/5011* (2013.01); *G06F 9/5027* (2013.01); *G06F 2209/509* (2013.01)

(58) Field of Classification Search
CPC .... G06F 9/5027; G06F 9/5011; G06F 9/5077; G06F 9/468; G06F 9/5022;
(Continued)

(56) References Cited

U.S. PATENT DOCUMENTS

| | | |
|---|---|---|
| 7,478,117 B1 | 1/2009 | Lamb et al. |
| 7,606,892 B2 | 10/2009 | Piet et al. |

(Continued)

FOREIGN PATENT DOCUMENTS

| | | |
|---|---|---|
| WO | 2005071552 A1 | 8/2005 |
| WO | 2007120772 A2 | 10/2007 |

OTHER PUBLICATIONS

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.

(Continued)

*Primary Examiner* — Emerson C Puente
*Assistant Examiner* — Zhi Chen
(74) *Attorney, Agent, or Firm* — Chamberlain, Hrdlicka, White, Williams & Aughtry; Aly Dossa

(57) ABSTRACT

A system control processor manager uses composed information handling systems that utilize resource sets of information handling systems and an infrastructure manager. The infrastructure manager obtains a composition request for a composed information handling system; allocates a portion of resource sets to the composed information handling system using a telemetry data map; makes a determination that at least one of the portion of the allocated resource sets is hosted by an information handling system that does not include a physical system control processor; and in response to the determination: provides the information handling system with access to a system control processor without adding any physical system control processors to the information handling system; and directs access requests, by entities hosted by the information handling system and (Continued)

directed to the portion of the allocated resource sets, through the system control processor.

3 Claims, 12 Drawing Sheets

(58) Field of Classification Search
CPC ......... G06F 2209/509; G06F 2209/508; G06F 2209/506
See application file for complete search history.

(56) References Cited

U.S. PATENT DOCUMENTS

| | | | |
|---|---|---|---|
| 7,620,984 | B2 | 11/2009 | Kallahalla |
| 8,095,929 | B1 | 1/2012 | Ji et al. |
| 8,245,053 | B2 | 8/2012 | Hoang et al. |
| 8,266,636 | B2 | 9/2012 | Kharat et al. |
| 8,276,140 | B1 | 9/2012 | Beda, III et al. |
| 8,285,747 | B1 | 10/2012 | English |
| 8,306,948 | B2 | 11/2012 | Chou |
| 8,499,066 | B1 | 7/2013 | Zhang et al. |
| 8,589,659 | B1 | 11/2013 | Shapiro |
| 8,606,920 | B1 | 12/2013 | Gupta et al. |
| 8,751,546 | B1 | 6/2014 | Grieve |
| 8,997,242 | B2 | 3/2015 | Chen |
| 9,104,844 | B2 | 8/2015 | Fang |
| 9,105,178 | B2 | 8/2015 | Carlson |
| 9,245,096 | B2 | 1/2016 | Abuelsaad |
| 9,413,819 | B1 | 8/2016 | Berg et al. |
| 9,529,689 | B2 | 12/2016 | Ferris et al. |
| 9,569,266 | B2 | 2/2017 | Chen et al. |
| 9,569,598 | B2 | 2/2017 | Abuelsaad |
| 9,600,553 | B1 | 3/2017 | Nigade et al. |
| 9,613,147 | B2 | 4/2017 | Carlson |
| 9,678,977 | B1 | 6/2017 | Aronovich |
| 9,806,979 | B1 | 10/2017 | Felstaine et al. |
| 9,898,316 | B1* | 2/2018 | Chalmer ............ G06F 9/45558 |
| 9,916,200 | B2 | 3/2018 | Xu |
| 9,923,785 | B1 | 3/2018 | Li et al. |
| 9,959,140 | B2 | 5/2018 | Jackson |
| 10,091,295 | B1 | 10/2018 | Savic |
| 10,097,438 | B2 | 10/2018 | Ferris et al. |
| 10,348,574 | B2 | 7/2019 | Kulkarni |
| 10,382,279 | B2 | 8/2019 | Roese |
| 10,601,903 | B2 | 3/2020 | Bivens |
| 10,628,225 | B2 | 4/2020 | Yamato |
| 10,754,741 | B1 | 8/2020 | Sethuramalingam et al. |
| 10,756,990 | B1 | 8/2020 | Chakkassery Vidyadharan et al. |
| 10,782,882 | B1 | 9/2020 | Wu |
| 10,795,856 | B1 | 10/2020 | Smith et al. |
| 10,848,408 | B2 | 11/2020 | Uriel |
| 10,860,362 | B2 | 12/2020 | Lal et al. |
| 10,860,380 | B1 | 12/2020 | Kowalski et al. |
| 10,909,072 | B2 | 2/2021 | Sun et al. |
| 10,909,283 | B1 | 2/2021 | Wang et al. |
| 10,994,198 | B1 | 5/2021 | Byskal et al. |
| 11,093,139 | B1 | 8/2021 | Karr |
| 11,119,739 | B1 | 9/2021 | Allen et al. |
| 11,133,030 | B1* | 9/2021 | Shen .................. G11B 19/02 |
| 11,134,013 | B1 | 9/2021 | Allen et al. |
| 11,221,886 | B2 | 1/2022 | Bivens et al. |
| 11,288,056 | B1 | 3/2022 | Shetty et al. |
| 11,288,102 | B2 | 3/2022 | Hamilton et al. |
| 11,308,234 | B1 | 4/2022 | Stapleton |
| 11,397,739 | B2 | 7/2022 | Pfitzmann et al. |
| 11,537,421 | B1 | 12/2022 | Brooker et al. |
| 11,616,686 | B1 | 3/2023 | Chandrachood et al. |
| 2002/0188711 | A1* | 12/2002 | Meyer ................ G06F 11/2089 709/224 |
| 2003/0028642 | A1 | 2/2003 | Agarwal et al. |
| 2003/0061262 | A1 | 3/2003 | Hahn et al. |
| 2003/0233427 | A1 | 12/2003 | Taguchi |
| 2004/0257998 | A1 | 12/2004 | Chu et al. |
| 2006/0082222 | A1 | 4/2006 | Pincu et al. |
| 2006/0089951 | A1 | 4/2006 | Factor et al. |
| 2006/0161884 | A1 | 7/2006 | Lubrecht et al. |
| 2006/0230407 | A1 | 10/2006 | Rosu et al. |
| 2006/0236100 | A1 | 10/2006 | Baskaran et al. |
| 2008/0052480 | A1 | 2/2008 | Satoyama et al. |
| 2008/0313476 | A1 | 12/2008 | Hansen |
| 2009/0199193 | A1 | 8/2009 | Jackson |
| 2009/0282404 | A1 | 11/2009 | Khandekar et al. |
| 2010/0138656 | A1 | 6/2010 | Chinen et al. |
| 2010/0217865 | A1 | 8/2010 | Ferris |
| 2011/0055378 | A1 | 3/2011 | Ferris et al. |
| 2011/0099147 | A1 | 4/2011 | Mcalister et al. |
| 2011/0154500 | A1 | 6/2011 | Sahita et al. |
| 2011/0258248 | A1 | 10/2011 | Jackson |
| 2011/0307570 | A1 | 12/2011 | Speks |
| 2012/0047328 | A1 | 2/2012 | Williams et al. |
| 2012/0066483 | A1* | 3/2012 | Boury ................ G06F 9/3885 712/E9.06 |
| 2012/0131161 | A1 | 5/2012 | Ferris et al. |
| 2012/0221314 | A1 | 8/2012 | Bourlatchkov et al. |
| 2012/0222084 | A1 | 8/2012 | Beaty et al. |
| 2013/0007710 | A1 | 1/2013 | Vedula et al. |
| 2013/0311434 | A1 | 11/2013 | Jones |
| 2013/0332901 | A1 | 12/2013 | Berg et al. |
| 2013/0346718 | A1 | 12/2013 | Meshchaninov et al. |
| 2014/0007097 | A1 | 1/2014 | Chin et al. |
| 2014/0149635 | A1 | 5/2014 | Bacher et al. |
| 2014/0165063 | A1 | 6/2014 | Shiva et al. |
| 2014/0223233 | A1 | 8/2014 | Heyrman et al. |
| 2014/0279884 | A1 | 9/2014 | Dantkale et al. |
| 2014/0282820 | A1 | 9/2014 | Walton et al. |
| 2014/0358972 | A1 | 12/2014 | Guarrieri et al. |
| 2014/0359356 | A1 | 12/2014 | Aoki |
| 2015/0085868 | A1* | 3/2015 | Snyder, II ........... G06F 9/45558 370/401 |
| 2015/0106165 | A1 | 4/2015 | Rai et al. |
| 2015/0121394 | A1 | 4/2015 | Chen et al. |
| 2015/0178128 | A1 | 6/2015 | Knowles et al. |
| 2015/0220455 | A1 | 8/2015 | Chen et al. |
| 2015/0263890 | A1 | 9/2015 | Fall |
| 2015/0281336 | A1 | 10/2015 | Beale |
| 2015/0317173 | A1 | 11/2015 | Anglin |
| 2015/0381426 | A1 | 12/2015 | Roese et al. |
| 2016/0062441 | A1 | 3/2016 | Chou et al. |
| 2016/0103698 | A1 | 4/2016 | Yang et al. |
| 2016/0180087 | A1 | 6/2016 | Edwards et al. |
| 2016/0224903 | A1 | 8/2016 | Talathi et al. |
| 2016/0259665 | A1 | 9/2016 | Gaurav et al. |
| 2016/0275377 | A1* | 9/2016 | Mathew ................ G06T 7/269 |
| 2017/0031622 | A1 | 2/2017 | Nagarajan et al. |
| 2017/0034012 | A1 | 2/2017 | Douglas et al. |
| 2017/0041184 | A1 | 2/2017 | Broz et al. |
| 2017/0048200 | A1 | 2/2017 | Chastain |
| 2017/0097851 | A1 | 4/2017 | Chen |
| 2017/0118247 | A1 | 4/2017 | Hussain |
| 2017/0195201 | A1 | 7/2017 | Mueller et al. |
| 2017/0201574 | A1 | 7/2017 | Luo |
| 2017/0295107 | A1 | 10/2017 | Salapura et al. |
| 2018/0024964 | A1 | 1/2018 | Mao |
| 2018/0026905 | A1 | 1/2018 | Balle et al. |
| 2018/0027067 | A1* | 1/2018 | Guim Bernat ...... G06F 16/2379 709/226 |
| 2018/0063145 | A1 | 3/2018 | Cayton et al. |
| 2018/0074816 | A1 | 3/2018 | Moss et al. |
| 2018/0157429 | A1 | 6/2018 | Venkat et al. |
| 2018/0157444 | A1* | 6/2018 | Franciosi ................ G06F 3/067 |
| 2018/0246749 | A1* | 8/2018 | van Riel ............... G06F 9/5077 |
| 2018/0288503 | A1 | 10/2018 | Chayat |
| 2018/0351836 | A1 | 12/2018 | Guim Bernat et al. |
| 2019/0014193 | A1 | 1/2019 | Guim Bernat et al. |
| 2019/0065061 | A1 | 2/2019 | Kim et al. |
| 2019/0065256 | A1 | 2/2019 | Hamilton et al. |
| 2019/0079837 | A1 | 3/2019 | Agarwal et al. |
| 2019/0164087 | A1 | 5/2019 | Ghibril et al. |
| 2019/0188014 | A1 | 6/2019 | Easterling et al. |
| 2019/0190778 | A1 | 6/2019 | Easterling et al. |
| 2019/0191106 | A1* | 6/2019 | Dabral ................ H04N 23/45 |
| 2019/0205180 | A1 | 7/2019 | Macha et al. |
| 2019/0227616 | A1 | 7/2019 | Jenne et al. |
| 2019/0250937 | A1* | 8/2019 | Thomas ............... G06F 9/5083 |

(56) References Cited

U.S. PATENT DOCUMENTS

| | | |
|---|---|---|
| 2019/0281373 A1 | 9/2019 | Sadasivarao et al. |
| 2019/0324808 A1 | 10/2019 | Krishnan et al. |
| 2019/0334774 A1 | 10/2019 | Bennett et al. |
| 2019/0356729 A1 | 11/2019 | Bivens et al. |
| 2019/0356731 A1 | 11/2019 | Bivens et al. |
| 2019/0384516 A1 | 12/2019 | Bernat |
| 2019/0384648 A1 | 12/2019 | Wiggers et al. |
| 2019/0386902 A1 | 12/2019 | Mueller et al. |
| 2019/0391798 A1 | 12/2019 | Farrell |
| 2020/0026428 A1 | 1/2020 | Vithalkar |
| 2020/0026564 A1 | 1/2020 | Bahramshahry et al. |
| 2020/0028854 A1 | 1/2020 | Fabrizi et al. |
| 2020/0034221 A1 | 1/2020 | Ganesan et al. |
| 2020/0034528 A1 | 1/2020 | Yang et al. |
| 2020/0044966 A1 | 2/2020 | Krishnan et al. |
| 2020/0045116 A1 | 2/2020 | Deodhar et al. |
| 2020/0065254 A1 | 2/2020 | Cao et al. |
| 2020/0097348 A1 | 3/2020 | Mahindru |
| 2020/0097358 A1 | 3/2020 | Mahindru et al. |
| 2020/0110639 A1 | 4/2020 | Corsi et al. |
| 2020/0117831 A1 | 4/2020 | Eckhard |
| 2020/0136994 A1 | 4/2020 | Doshi |
| 2020/0174949 A1 | 6/2020 | Ramasamy et al. |
| 2020/0218561 A1 | 7/2020 | Lal et al. |
| 2020/0233582 A1 | 7/2020 | Chen et al. |
| 2020/0241798 A1 | 7/2020 | Kanno |
| 2020/0257547 A1 | 8/2020 | Oshins |
| 2020/0264998 A1 | 8/2020 | Long et al. |
| 2020/0285502 A1 | 9/2020 | Hildebrand et al. |
| 2020/0293375 A1 | 9/2020 | Klein |
| 2020/0341786 A1 | 10/2020 | Soryal |
| 2020/0341798 A1 | 10/2020 | Duleba |
| 2020/0351221 A1 | 11/2020 | Subramani et al. |
| 2020/0351347 A1 | 11/2020 | Chang et al. |
| 2020/0356200 A1 | 11/2020 | Blanco et al. |
| 2020/0358714 A1 | 11/2020 | Singleton, IV et al. |
| 2020/0364001 A1 | 11/2020 | Bhandari et al. |
| 2020/0387321 A1 | 12/2020 | Bansal et al. |
| 2020/0401457 A1* | 12/2020 | Singhal .................. G06F 9/5033 |
| 2021/0019062 A1 | 1/2021 | Fessel |
| 2021/0019162 A1 | 1/2021 | Viswanathan et al. |
| 2021/0037466 A1 | 2/2021 | Silva et al. |
| 2021/0111942 A1 | 4/2021 | Tahhan et al. |
| 2021/0117389 A1 | 4/2021 | Cui et al. |
| 2021/0117441 A1 | 4/2021 | Patel et al. |
| 2021/0152659 A1 | 5/2021 | Cai et al. |
| 2021/0185565 A1 | 6/2021 | Kalderen et al. |
| 2021/0224093 A1 | 7/2021 | Fu et al. |
| 2021/0233532 A1 | 7/2021 | Kudurshian et al. |
| 2021/0250220 A1 | 8/2021 | Yang et al. |
| 2021/0258265 A1 | 8/2021 | Guim Barnat |
| 2021/0286667 A1 | 9/2021 | Yigzaw et al. |
| 2021/0367901 A1 | 11/2021 | Singh et al. |
| 2021/0383020 A1 | 12/2021 | Sofia et al. |
| 2021/0397494 A1 | 12/2021 | Graham |
| 2022/0121546 A1 | 4/2022 | Chawla |
| 2022/0179701 A1 | 6/2022 | Saad et al. |
| 2022/0182288 A1 | 6/2022 | Vaikar et al. |
| 2022/0191253 A1 | 6/2022 | Rungta et al. |
| 2022/0197773 A1 | 6/2022 | Butler et al. |
| 2022/0342649 A1 | 10/2022 | Cao et al. |
| 2023/0026690 A1 | 1/2023 | Dawkins et al. |
| 2023/0033296 A1 | 2/2023 | Shetty et al. |
| 2023/0093900 A1 | 3/2023 | Scope et al. |
| 2023/0237204 A1 | 7/2023 | Khatri et al. |

OTHER PUBLICATIONS

International Searching Authority, International Search Report and Written Opinion dated Oct. 21, 2021 for corresponding PCT Application No. PCT2021029708 filed Apr. 28, 2021.

International Searching Authority, International Search Report and Written Opinion for corresponding PCT Application No. PCT2021029702 filed Apr. 28, 2021, Aug. 19, 2021, 13 pages.

International Searching Authority, International Search Report Written Opinion mailed Jul. 19, 2021, Issued in corresponding PCT Application No. PCT/US2021/029687, 11 pages.

International Searching Authority, International Search Report Written Opinion of corresponding PCT Application No. PCT/US2021/029698, Aug. 9, 2021, 15 pages.

Mohammadi et al., "Towards an End-to-End Architecture for Runtime Data Protection in the Cloud", 2018 44th Euromicro Conference on Software Engineering and Advanced Applications (SEAA), IEEE, pp. 514-518. (Year: 2018).

Alachiotis, Nikolaos, et al. "dReDBox: A Disaggregated Architectural Perspective for Data Centers", Hardware Accelerators in Data Centers; Springer International Publishing AG, pp. 35-56. (Year: 2019).

Chunlin, Li et al., "Hybrid Cloud Adaptive Scheduling Strategy for Heterogeneous Workloads", Journal of Grid Computing 17, pp. 419-446, (Year: 2019) (28 pages).

International Search Report and Written Opinion of the International Searching Authority mailed Oct. 21, 2021, Issued in corresponding PCT Application No. PCT/US2021/029708 (12 pages).

International Search Report and Written Opinion of the International Searching Authority mailed Aug. 19, 2021, Issued in corresponding PCT Application No. PCT/US2021/029702 (13 pages).

International Search Report and Written Opinion of the International Searching Authority mailed Aug. 9, 2021, issued In corresponding PCT Application No. Application No. PCT/US2021/029698 (15 pages).

International Search Report and Written Opinion of the International Searching Authority mailed Jul. 19, 2021, issued In corresponding PCT Application No. PCT/US2021/029687 (11 pages).

Francesco Paolucci et al., "Telemetry in Disaggregated Optical Networks", 2020 International Conference on Optical Network Design and Modeling (ONDM) (Year: 2020).

Marcio Barbosa De Carvalho et al., "A Cloud Monitoring Framework for Self-Configured Monitoring Slices Based on Multiple Tools", pp. 180-184 (Year: 2013).

Peter X. Gao et al., "Network Requirements for Resource Disaggregation", pp. 249-264 (Year: 2016).

Yuxin Cheng et al., "Disaggregated Data Centers: Challenges and Tradeoffs", (Year: 2020).

Anna Levin et al., Network Monitoring in Federated Cloud Environment, IEEE Xplore, Year: 2017 (6 pages).

Mahantesh N. Birje et al., Cloud Monitoring System: Basics, Phases and Challenges, International Journal of Recent Technology and Engineering, pp. 4732-4746, Dec. 2019 (16 pages).

Richard G. Clegg et al., On the Selection of Management/Monitoring Nodes in Highly Dynamic Networks, IEEE Transactions on Computers, vol. 62, No. 6, pp. 1207-1220, Jun. 2013 (14 pages).

Dinesh Chandra Verma, Principles of Computer Systems and Network Management, Principles of Computer Systems and Network Management, Unknown, 27 pages, 2009.

Elisson Da Silva Rocha et al., Aggregating data center measurements for availability analysis, Aggregating data center measurements for availability analysis, Unknown, 25 pages, 2020.

* cited by examiner

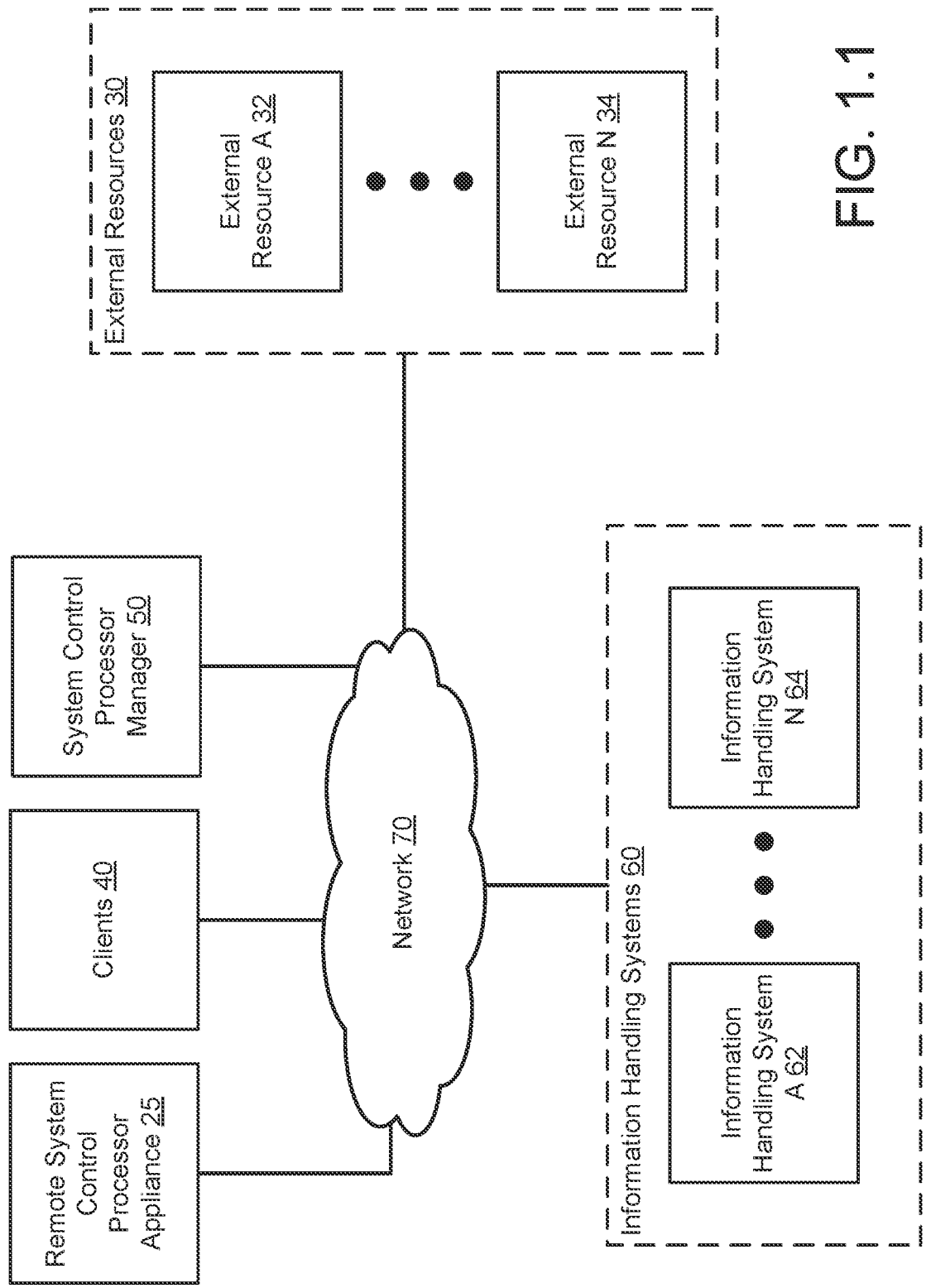
FIG. 1.1

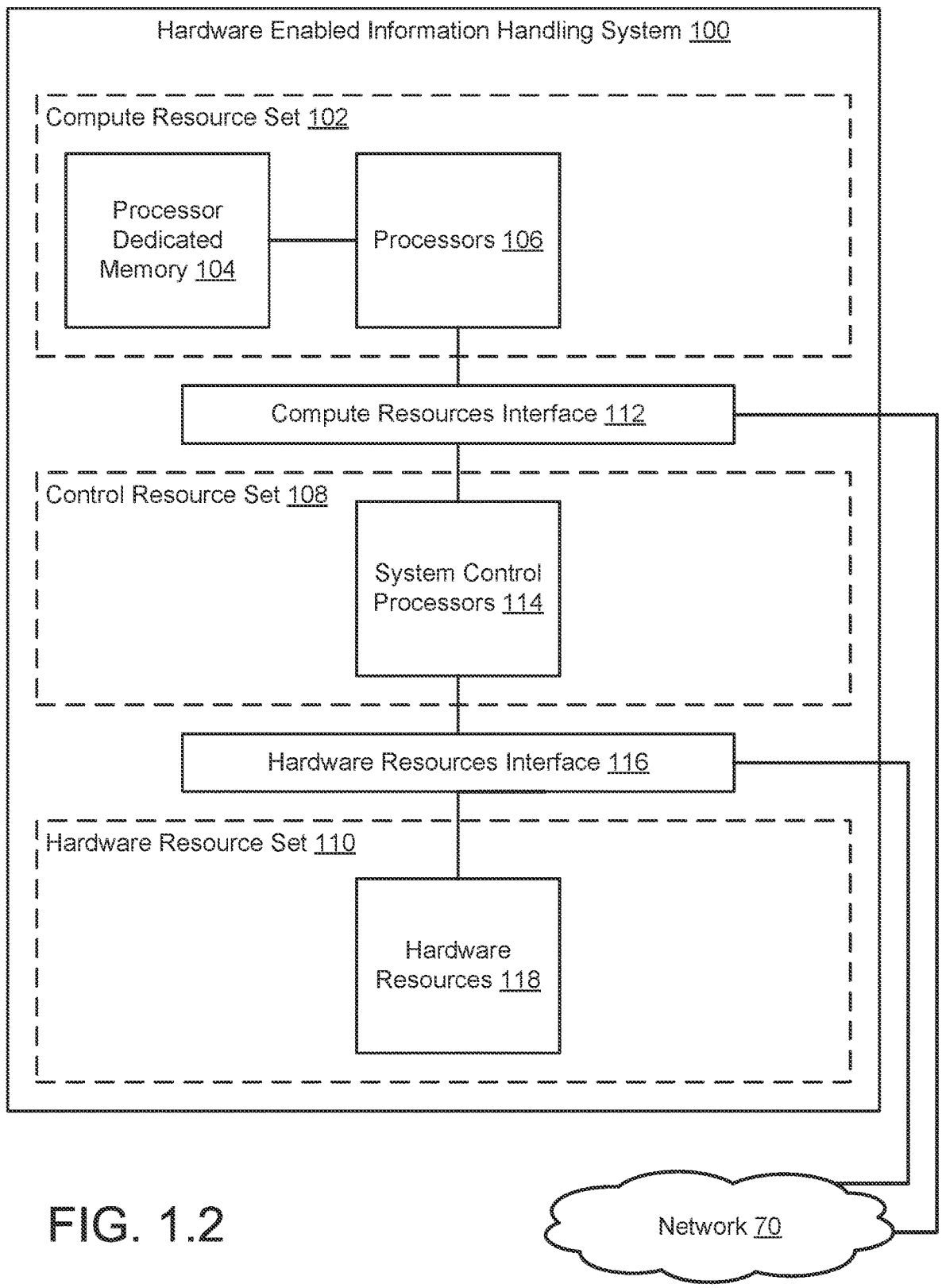
FIG. 1.2

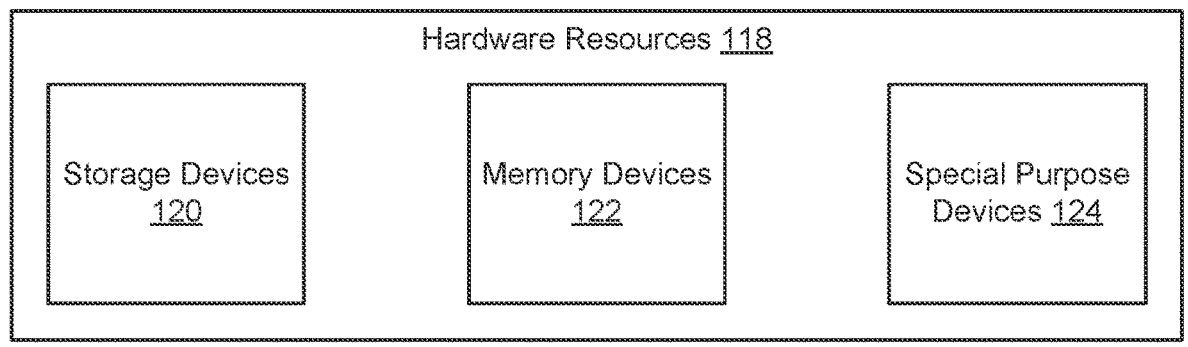
FIG. 1.3

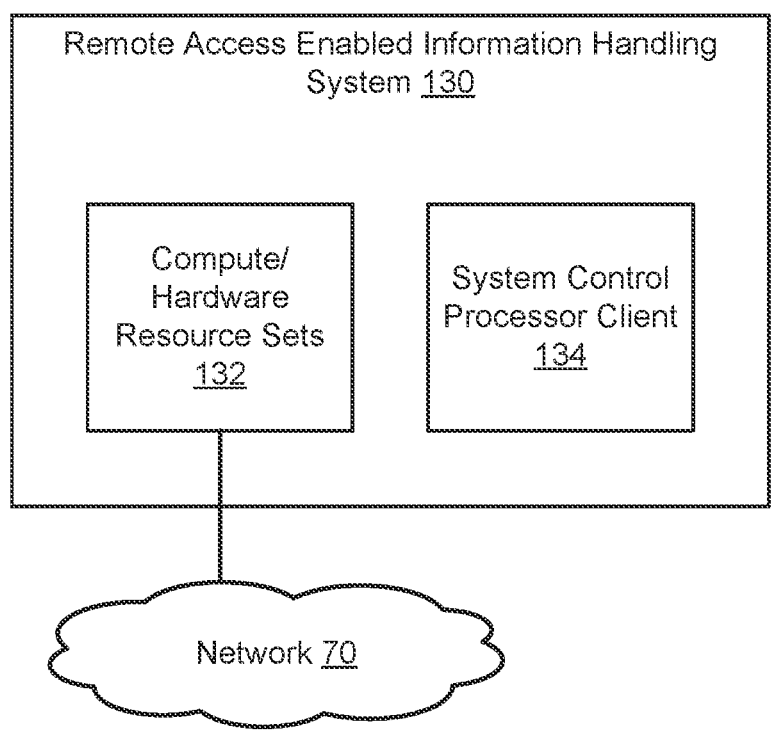
FIG. 1.4

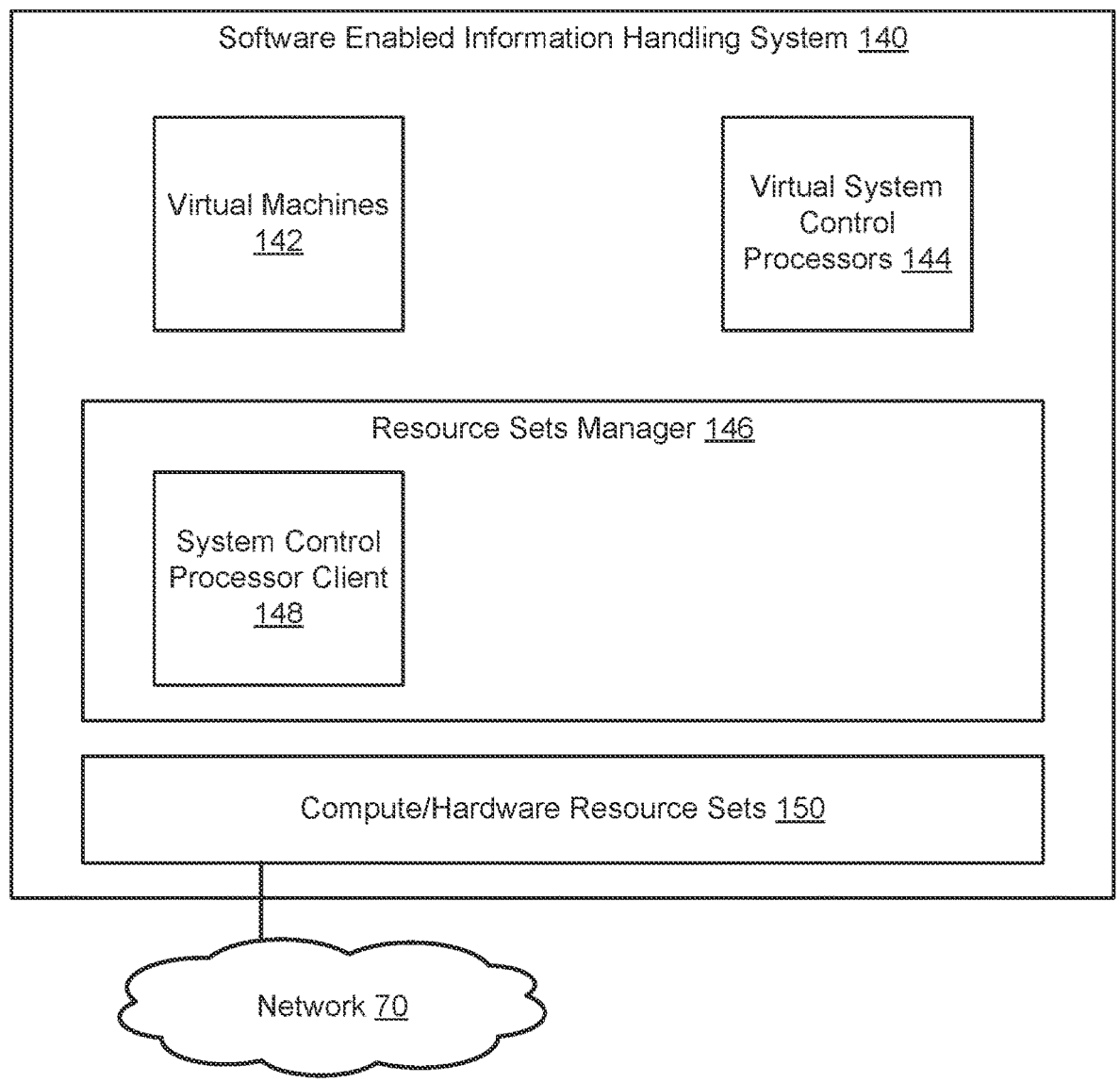
FIG. 1.5

US 12,204,946 B2

METHOD AND SYSTEM FOR PROVIDING COMPOSABLE INFRASTRUCTURE CAPABILITIES

BACKGROUND

Computing devices may provide services. To provide the services, the computing devices may include hardware components and software components. The services provided by the computing devices may be limited by these components.

SUMMARY

In one aspect, a system control processor manager for providing computer implemented services using composed information handling systems that utilize resource sets of information handling systems in accordance with one or more embodiments of the invention includes storage for storing a telemetry data map of the resource sets of the information handling systems and an infrastructure manager. The infrastructure manager obtains a composition request for a composed information handling system; allocates a portion of the resource sets to the composed information handling system using the telemetry data map; makes a determination that at least one of the portion of the allocated resource sets is hosted by an information handling system of the information handling systems that does not include a physical system control processor; and in response to the determination: provides the information handling system with access to a system control processor without adding any physical system control processors to the information handling system; and directs access requests, by entities hosted by the information handling system and directed to the portion of the allocated resource sets, through the system control processor.

In one aspect, a method for providing computer implemented services using composed information handling systems that utilize resource sets of information handling systems in accordance with one or more embodiments of the invention includes obtaining a composition request for a composed information handling system; allocating a portion of the resource sets to the composed information handling system using a telemetry data map of the resource sets of the information handling systems; making a determination that at least one of the portion of the allocated resource sets is hosted by an information handling system of the information handling systems that does not include a physical system control processor; and in response to the determination: providing the information handling system with access to a system control processor without adding any physical system control processors to the information handling system; and directing access requests by entities hosted by the information handling system and directed to the portion of the allocated resource sets through the system control processor.

In one aspect, a non-transitory computer readable medium in accordance with one or more embodiments of the invention includes computer readable program code, which when executed by a computer processor enables the computer processor to perform a method for providing computer implemented services using composed information handling systems that utilize resource sets of information handling systems. The method includes obtaining a composition request for a composed information handling system; allocating a portion of the resource sets to the composed information handling system using a telemetry data map of the resource sets of the information handling systems; making a determination that at least one of the portion of the allocated resource sets is hosted by an information handling system of the information handling systems that does not include a physical system control processor; and in response to the determination: providing the information handling system with access to a system control processor without adding any physical system control processors to the information handling system; and directing access requests by entities hosted by the information handling system and directed to the portion of the allocated resource sets through the system control processor.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 1.3 shows a diagram of hardware resources in accordance with one or more embodiments of the invention.

FIG. 1.4 shows a diagram of a remote access enabled information handling system in accordance with one or more embodiments of the invention.

FIG. 1.5 shows a diagram of a software enabled information handling system in accordance with one or more embodiments of the invention.

DETAILED DESCRIPTION

Figure 2:
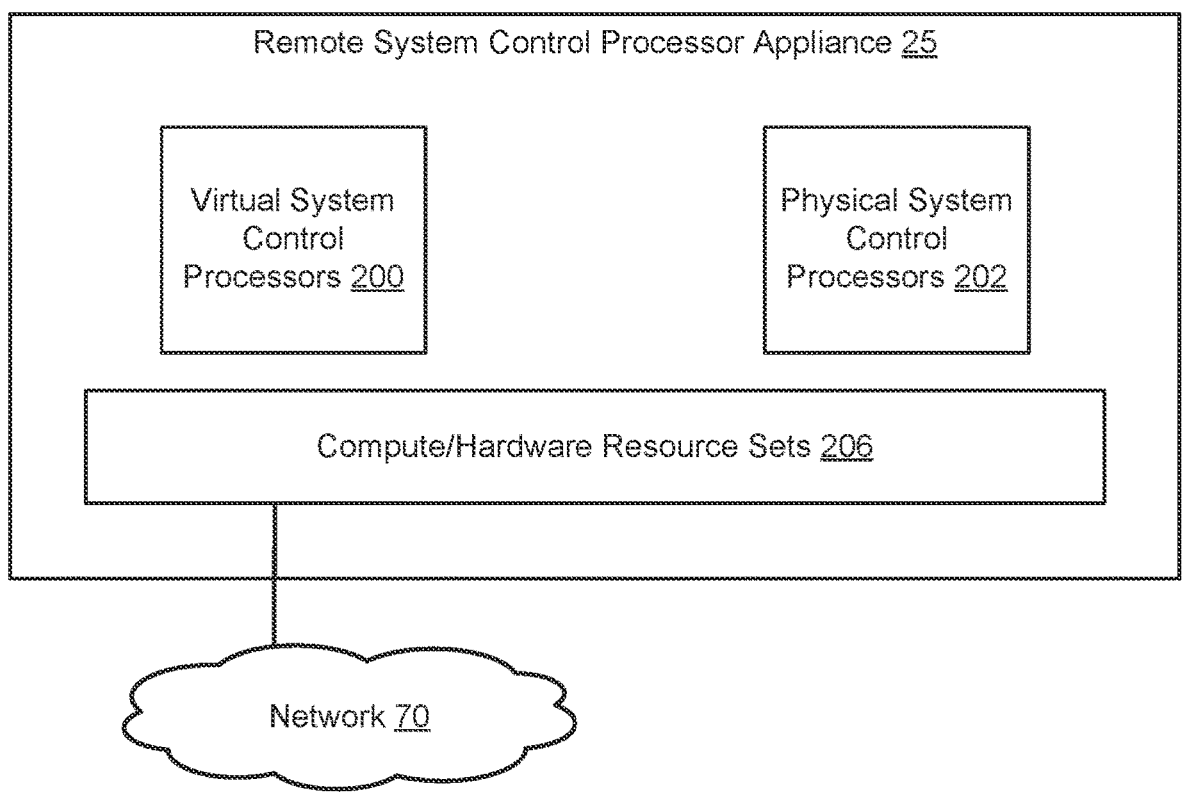
FIG. 2 shows a diagram of a remote system control processor appliance in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services. The computing resources may include, for example, processing resources, memory, resources, storage resources, etc. These computing resources may be provided by any number of hardware devices referred to as resource set components when allocated to a system.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To form a composed information handling system, on or more system control processors may be utilized. A system control processor may be a device that mediates the management and presentation of resources to other resources in a system. For example, a system control processor may manage a storage device by virtualizing it into multiple volumes and may present the different volumes to separate processors executing applications as separate bare metal resources (e.g., as though the volumes are actually physical disks) even though the resources of the storage device are being managed in accordance with any number of layers of abstraction.

However, not all information handling systems may include system control processors, or the information handling systems may include system control processors with limited capabilities. For example, some system control processors may be unable to provide desired layers of abstraction, may be unable to manage certain types of devices, may have insufficient processing capacity to perform certain types of actions, etc. Consequently, some information handling systems may not be able to be natively composed by virtue of lack of system control processor functionality.

Embodiments of the invention may provide methods and system for providing information handling systems with system control processor functionality without adding physical system control processors to the information handling systems. By doing so, system control processor functionality may be dynamically added to or removed from information handling systems. Consequently, information handling systems that lack desired or necessary system control processor functionality may be used to form composed information handling systems. Accordingly, resources that would otherwise go to waste for lack of allocation may be utilized to form composed systems.

To provide system control processor functionality to information handling systems, virtualized or physical system control processors (existing or newly instantiated) may be allocated to the information handling systems. These system control processors may be local (e.g., hosted by the information handling systems to which they will be allocated) or remote (e.g., hosted by another device such as a remote system control processor appliance, discussed in greater detail below).

Thus, embodiments of the invention may provide for improved utilization of computing resources assets by making it more likely that resources of information handling systems may be used to form composed information handling systems. For example, by improving the ability of information handling systems to be utilized in composed systems, the corresponding computing resources of the information handling systems are more likely to have a higher use rate thereby improving the utilize of these resources. Accordingly, a system in accordance with embodiments of the invention may more efficiently marshal limited computing resources to provide desired computer implemented services.

Turning to FIG. 1.1, FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling systems of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services.

Clients (40) may request that the computer implemented services be provided. For example, the clients (40) may send requests to management entities to have the computer implemented services be provided.

In general, embodiments of the invention relate to systems, methods, and devices for managing the hardware resources of the information handling systems (60) and/or other resources (e.g., external resources (30)) to provide computer implemented services. The hardware resources of the information handling systems (60) may be managed by instantiating one or more composed information handling systems using the computing resources of the information handling systems (60), external resources (30), and/or other types of hardware devices operably connected to the information handling systems (60). Consequently, the computing resources allocated to a composed information handling system may be tailored to the specific needs of the services that will be provided by the composed information handling system. When specific hardware devices are allocated to a composed system, the allocated hardware devices may be referred to as resource set components.

To instantiate composed information handling systems, system control processors may be utilized. As will be discussed in greater detail below, system control processor may manage the presentation of resources to other resources (e.g., presentation of abstracted physical resource as bare metal resources).

However, only a portion of the information handling systems (60) may include system control processors. Further, different information handling systems that do host system control processors may host different versions of system control processors having different capabilities (e.g., reduced functionality system control processors).

To facilitate instantiation of composed information handling systems using information handling systems that do not host system control processors or host reduced functionality system control processors, embodiments of the invention may provide methods for providing these information handling systems with access to system control processor functionality.

The access to system control processor functionality may be provided, for example, remotely through access to a system control processor (physical or virtual) hosted by another device such as a remote system control processor appliance or locally through an emulated system control processor (e.g., a virtual machine/application hosted by the information handling system that provides the capabilities of the system control processor. To facilitate this access, a client may be instantiated at composition and/or recomposition time in an information handling system. The client may facilitate remote and/or local access to system control processors thereby enabling the system control processors to provide access to other hardware devices.

To enable provide access to system control processor functionality, the system of FIG. 1.1 may include a remote system control processor appliance (25). The remote system control processor appliance (25) may (i) host any number of physical and/or virtual system control processors and (ii) provide information handling systems (60) with access to the processors. The remote system control processor appliance (25) may do so in cooperation with a system control processor manager (50) that orchestrates the process of instantiating and/or recomposing composed information handling systems. For example, the system control processor manager (50) may provide information to the remote system control processor appliance (25) regarding a composed information handling system that enables the remote system control processor appliance (25) to allocate system control processor functionality to the composed information handling system. For additional details regarding providing information handling systems with system control processor functionality, refer to FIGS. 1.4-1.5.

To manage the operation of information handling systems, the system may include a system control processor manager (50). The system control processor manager (50) may provide composed information handling system management services. Composed information handling system management services may include (i) obtaining composition requests for composed information handling systems from, for example, the clients (40) and (ii) allocating resources from the information handling systems (60) and/or external resources (30) using system control processors to service the composition requests by instantiating composed information handling systems in accordance with the requests. By doing so, instantiated composed information handling systems may manage their operating states to maintain desired modes of operation.

The remote system control processor appliance (25) may operate in conjunction with or independently from the system control processor manager (50). For example, in some embodiments of the invention, when a new composed system is to be instantiated, the system control processor manager (50) may notify the remote system control processor appliance (25) and the remote system control processor appliance (25) may allocate system control processor functionality in accordance with the notification. The system control processor manager (50) may configure resource sets allocated to the composed information handling system to cause the resource sets to communicate with the allocated system control processor functionality.

For example, the system control processor manager (50) may establish virtual private networks through which the resource sets and system control processor functionality communicate, may assign identifiers to resource set components and system control processor functionality, may load software components and/or configure any of the aforementioned resource sets and system control processor functionality, and/or may perform other actions to manage composed information handling systems.

Returning to the discussion of the system control processor manager (50), it may instantiate the composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model. When information handling systems that do not have the necessary system control processor functionality as part of a control resource set, the system control processor manager (50) may provide the system control processor functionality to the information handling system functionality by allocating it (e.g., either by using existing system control processor functionality or creating new system control processor functionality by instantiating new instances of virtualized system control processors).

By logically dividing the computing resources of an information handling system into these resource sets, different quantities and types of computing resources may be allocated to each composed information handling system thereby enabling the resources allocated to the respective information handling system to match performed workloads. Further, dividing the computing resources in accordance with the three set model may enable different resource sets (each including any number of resource set components) to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model.

For example, the system control processor functionality allocated to each composed information handling system, in addition to mediating resource presentation, may also perform other functionalities that are transparent to the other resources of the composed information handling system. Consequently, the resulting composed system may operate in accordance with unified frameworks without the control planes/activities being aware of the operations being performed that conform the operation of the composed systems to the unified frameworks.

In one or more embodiments of the invention, a composed information handling system is a device that is formed using all, or a portion, of the computing resources of the information handling systems (60), the external resources (30), system control processor functionality (e.g., remote or local, provided by physical or virtualized devices) and/or other types of hardware devices operably connected to the information handling systems (60). The composed information handling system may utilize the computing resources allocated to it to provide computer implemented services. Consequently, any number of resource set components from any number of information handling systems may generate operation data that is relevant to ascertaining the operation of a composed information handling system as a whole.

To instantiate composed information handling systems, the information handling systems (60) may include up to three resource sets including a control resource set. If an information handling system does not include a control resource set or does but is unable to provide required system control processor functionality, system control processor functionality may be allocated to the information handling system thereby enabling the information handling system to have control resource set functionality even though the required functionality is not natively provided by the information handling system.

The control resource set may include system control processor functionality (provided by physical or virtualized system control processors). The system control processor functionality of each information handling system may coordinate with the system control processor manager (50) to enable composed information handling systems to be instantiated. For example, the system control processor of an information handling system may manage telemetry data regarding the computing resources of an information handling system (e.g., types, capabilities, and quantities of resource set components), may perform actions on behalf of the system control processor manager (50) to aggregate computing resources together, may monitor the utilization and/or activity of computing resources for providing computer implemented services requested by the clients (40), and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction such as emulation, virtualization, indirection, security model, data integrity model, etc. For example, the system control processors of the control resource sets may provide the abstraction, emulation, virtualization, indirection, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems.

By virtue of providing these layers of abstraction, the control resource set may monitor the operation of any number of resource set components and may facilitate transmission of operation data of resource set components to an aggregation point. For example, when a processor needs to communicate with a hard disk drive of a hardware resource set, the communications may be routed through the control resource set. Consequently, the control resource set may transparently intercept these communications and perform analysis of these communications to identify the operating state of the processor and/or hard disk drive.

The external resources (30) may provide computing resources that may be allocated for use by composed information handling systems. For example, the external resources (30) may include hardware devices that provide any number and type of computing resources. The composed information handling system may use these resources to provide their functionalities. For example, system control processors may operably connect to and manage the external resources (30) to provide additional and/or different computing resources from those available to be provided only using hardware resource sets of information handling systems. By utilizing system control processors to manage these resources, the use of these external resources (30) for providing services requested by the clients (40) may also be efficiently and transparently monitored.

Different external resources (e.g., 32, 34) may provide similar or different computing resources. For example, some external resources may include large numbers of hard disk drives to provide storage resources while others may include graphics processing unit rendering farms. The external resources (30) may include any number and type of computing resources for allocation to composed information handling systems via system control processors of control resource sets. The control resource sets may similarly mediate communications between different resource sets of the information handling systems and the external resources

(30) thereby enabling the control resource sets to facilitate transmission of operation data from these components to an aggregation point.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The remote system control processor appliance (25), clients (40), system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the methods illustrated in FIGS. 5-6. The remote system control processor appliance (25), clients (40), system control processor manager (50), information handling systems (60), and/or external resources (30) may be implemented using other types of computing devices without departing from the invention. For additional details regarding computing devices, refer to FIG. 8.

While the system of FIG. 1.1 has been illustrated and described as including a limited number of specific components, a system in accordance with embodiments of the invention may include additional, fewer, and/or different components without departing from the invention.

Turning to FIG. 1.2, FIG. 1.2 shows a diagram of a hardware enabled information handling system (100) in accordance with one or more embodiments of the invention. Any of the information handling systems (e.g., 60) of FIG. 1.1 may be similar to the hardware enabled information handling system (100) illustrated in FIG. 1.2. However, some of the information handling systems (60) of FIG. 1.1 may be dissimilar to the hardware enabled information handling system (100). For example, some may not include a control resource set (108) and/or corresponding system control processors (114). Refer to FIGS. 1.4-1.5 for additional details regarding these other information handling systems.

As discussed above, the hardware enabled information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the hardware enabled information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the hardware enabled information handling system (100) may facilitate formation of composed information handling systems and management of the operation of the hardware enabled information handling system (100). To do so, the control resource set (108) may prepare any quantity of resources from any number of hardware resource sets (e.g., 110) (e.g., of the hardware enabled information handling system (100) and/or other information handling systems) for presentation to processing resources of any number of computing resource sets (e.g., 102) (e.g., of the hardware enabled information handling system (100) and/or other information handling systems). Once prepared, the control resource set (108) may present the prepared resources as bare metal resources to the processors (e.g., 106) of the allocated computing resources. By doing so, a composed information handling system may be instantiated. The control resource set (108) may due so based on the direction of a system control processor manager (e.g., 50, FIG. 1.1).

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources (e.g., the compute resource set may send bare metal communications to the control resource set, the control resource set may translate those bare metal communications into prepared resource compatible communications, and the control resource set may send the prepared resource compatible communications to the hardware resource set).

The control resource set (108) may also enable the utilization of any of the hardware components of the hardware enabled information handling system (100) by respective clients. When a composed information handling system is instantiated, it (and its hardware devices) may be utilized by a client by enabling the client to load application onto the composed information handling system. For example, the client may cause the composed information handling system to execute applications on the compute resource set (102)

which, in turn, may utilize any number of compute and/or hardware resource sets (e.g., 110) as part of their execution.

Because the control resource set (108) may mediate utilization of hardware resource sets (110) by compute resource sets (102), the control resource set (108) may transparently ascertain the utilization of the hardware devices (collectively referred to as resource set components of a composed information handling system) of these resource sets. To do so, the control resource set (108) may intercept (as part of presenting computing resources of hardware resource sets to compute resource sets) communications between resource sets which may be used to infer the utilization of these hardware devices.

While other information handling systems may not include control resource sets and corresponding system control processors, system control processor functionality may be provided to these systems. When so provided, the system control processor functionality may provide the same functionality as a control resource set, discussed above. For additional details regarding how system control processor functionality may be provided to information handling systems, refer to FIGS. 1.4-1.5.

The compute resource set (102) may include one or more processors (106). The processors (106) of the compute resource set (102) may be operably connected to one or more system control processors (114) of the control resource set (108). For example, the processors (106) may be connected to a compute resource interface (112), which is also connected to the system control processors (114). The compute resource interface (112) may enable the processors (106) to communicate with other entities via bare metal communications.

In a scenario in which the system control processor functionality is being provided using a remote device, the compute resource interface (112) may route communications to other resource sets through the remote device via network (70).

The system control processors (114) of the control resource set (108) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources (e.g., computing resources of the hardware resource set (110), external resources, other hardware resource sets of other information handling systems, etc.) to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and management may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model. The architecture or model may define, for example, when and how components communicate with one another, when and how resources are allocated, etc.

In one or more embodiments of the invention, control plane entities utilize computing resources presented through one or more layers of indirection, abstraction, virtualization, etc. In other words, an indirect use of hardware devices and computing resources provided thereby. In the information handling system of FIG. 1.2, the system control processors (114) may present abstracted resources, indirection layers, virtualization layers, etc. as bare metal resources.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110)), other resources operably connected to it via an interface (e.g., hardware resources interface (116), via the network (70) and local interface (e.g., 116), etc.) as bare metal resources to the processors (106) of the compute resource set (102). Consequently, the system control processors (114) may implement device discovery processes compatible with the processors (106) to enable the processors (106) to utilize the presented computing resources. Accordingly, the control plane of a composed information handling system may believe that any number of resources may be directly accessible as bare metal resources even when the resources are, for example, hosted by other information handling systems or other remote devices and managed using any number of layers of abstraction.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 1.3.

In another example, the system control processors (114) may be operably connected to other hardware resource sets of other information handling systems via hardware resources interface (116), network (70), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (70). The system control processors (114) may prepare and present the external resources as bare metal resources to the compute resource set (102).

Figure 3:
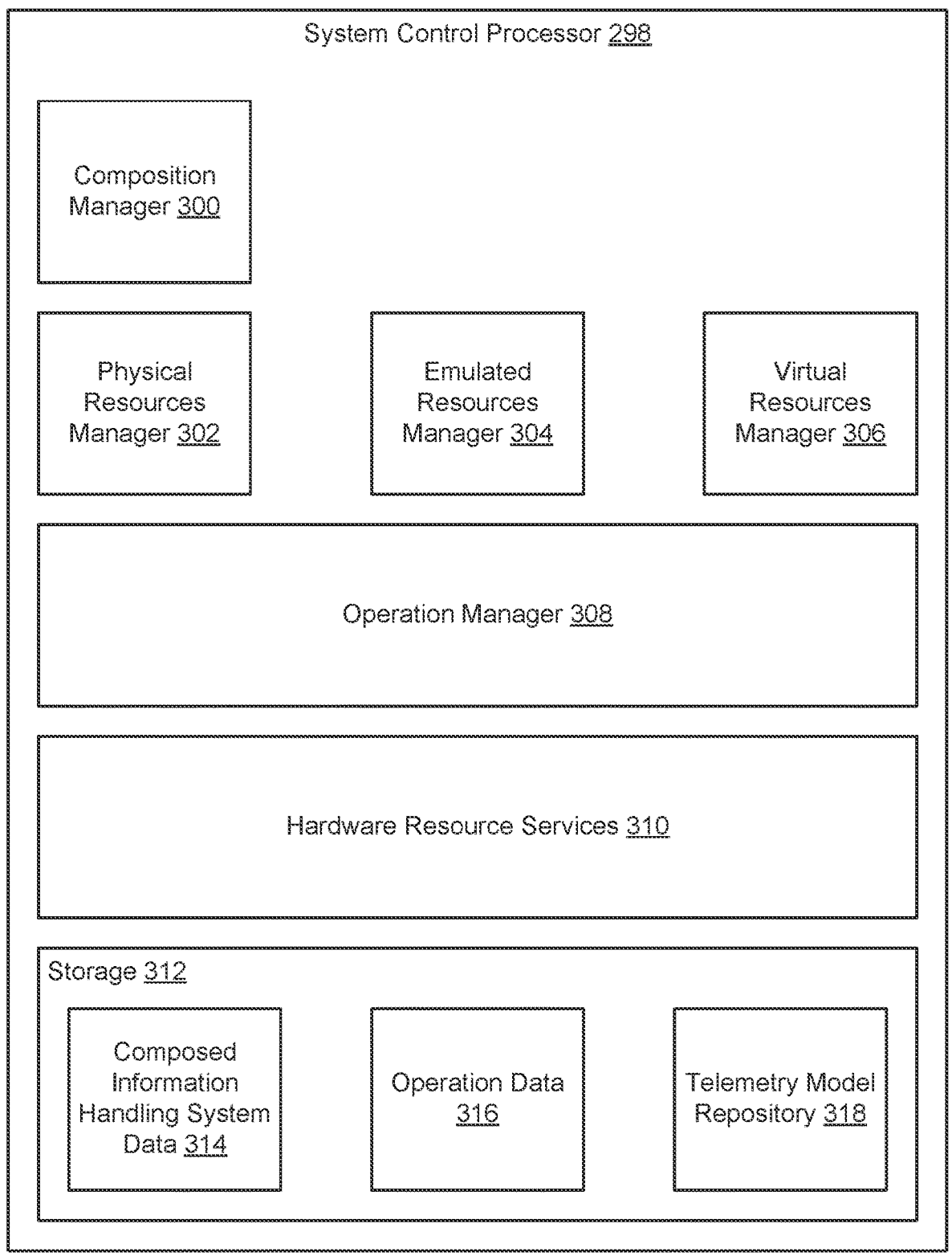
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The compute resources interface (112) may also support sideband communications between the system control processors (114), the processors (106), and/or the processor dedicated memory (104). Consequently, the system control processors (114) may be able to monitor (e.g., via collection of telemetry data) the operations of these other devices.

The hardware resources interface (116) may be implemented using any suitable interconnection technology including, for example, system buses such as compute express links or other interconnection protocols. The hardware resources interface (116) may support any input/output (IO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116). The hardware resources interface (116), like the compute resources interface (112), may facilitate communications with remote devices via network (70) thereby enable remote system control processor functionality to communicate with any number of resources set of the hardware enabled composed information handling system (100).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other. These devices may, for example, establish virtual private networks or other closed/secured communications networks to enable any number of devices hosted by any number and type of information handling system to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-band connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (70) may correspond to any type of network and may be operably connected to the Internet or other networks thereby enabling the hardware enabled information handling system (100) to communicate with any number and type of other devices.

The hardware enabled information handling system (100) may be implemented using computing devices. The computing devices may include, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the hardware enabled information handling system (100) described in this application and/or all, or a portion, of the methods illustrated in FIGS. 5-6. The hardware enabled information handling system (100) may be implemented using other types of computing devices without departing from the invention. For additional details regarding computing devices, refer to FIG. 8.

While the hardware enabled information handling system (100) has been illustrated and described as including a limited number of specific components, an information handling system in accordance with embodiments of the invention may include additional, fewer, and/or different components without departing from the invention.

Turning to FIG. 1.3, FIG. 1.3 shows a diagram of the hardware resources (118) in accordance with one or more embodiments of the invention. As noted above, system control processors of information handling systems may present resources including, for example, some of the hardware resources (118) to form a composed information handling system.

The hardware resources (118) may include any number and types of hardware devices that may provide any quantity and type of computing resources. For example, the hardware resources (118) may include storage devices (120), memory devices (122), and special purpose devices (124) (the aforementioned being referred to as resource set components when incorporated into a composed information handling system).

The storage devices (120) may provide storage resources (e.g., persistent storage) in which applications hosted by a composed information handling system may store data including any type and quantity of information. The storage devices (120) may include any type and quantity of devices for storing data. The devices may include, for example, hard disk drives, solid state drives, tape drives, etc. The storage devices (120) may include other types of devices for providing storage resources without departing from the invention. For example, the storage devices (120) may include controllers (e.g., redundant array of disk controllers), load balancers, and/or other types of devices.

The memory devices (122) may provide memory resources (e.g., transitory and/or persistent storage) in which a composed information handling system may store data including any type and quantity of information. The memory devices (122) may include any type and quantity of devices for storing data. The devices may include, for example, transitory memory such as random access memory, persistent memory such as enterprise class memory, etc. The memory devices (122) may include other types of devices for providing memory resources without departing from the invention. For example, the storage devices (120) may include controllers (e.g., replication managers), load balancers, and/or other types of devices.

The special purpose devices (124) may provide other types of computing resources (e.g., graphics processing resources, computation acceleration resources, etc.) to composed information handling systems. The special purpose devices (124) may include any type and quantity of devices for providing other types of computing resources. The special purpose devices (124) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (124) may include other types of devices for providing other types of computing resources without departing from the invention.

The system control processors (and/or system control processor functionality allocated to an information handling system) of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including, for example, data protection models, security models, workload performance availability models, reporting models, etc. For example, the system control processors may cause multiple copies of data to be redundantly stored, to be stored with error correction code, and/or other information usable for data integrity purposes.

The manner of operation of these devices may be transparent to the computing resource sets utilizing these hardware devices for providing computer implemented services. Consequently, even though the resulting composed information handling system control plane may be unaware of the implementation of these models, the composed information handling systems may still operate in accordance with these models thereby providing a unified method of managing the operation of composed information handling systems.

While the hardware resources (118) have been illustrated and described as including a limited number of specific components, hardware resources in accordance with embodiments of the invention may include additional, fewer, and/or different components without departing from the invention.

Returning to the discussion of FIG. 1.1, the system may include any number of different information handling systems (60). Some of the information handling systems (60) may not host physical system control processors. However, the system control processor manager (50) may provide these information handling systems with system control processor functionality by (i) allocating a system control processor that is remote to the information handling systems to the information handling system and/or (ii) by allocating a virtual system control processor that is either local (e.g., hosted by the information handling system) or remote (e.g., hosted by another information handling system, the remote system control processor appliance (25), and/or another entity). FIGS. 1.4 and 1.5 show diagrams of information handling systems that did not host a physical system control processor but have been provided with system control processor functionality. FIG. 2 shows a diagram of the remote system control processor appliance (25) which may host any number of system control processors that may be allocated to information handling systems (e.g., even information handling systems that host system control processors but could have enhanced functionality by being allocated one or more additional system control processors).

Turning to FIG. 1.4, FIG. 1.4 shows a diagram of a remote access enabled information handling system (130) in accordance with one or more embodiments of the invention. The remote access enabled information handling system (130) may provide similar functionality to the information handling system illustrated in FIG. 1.2. However, the remote access enabled information handling system (130) may not include a control resource set or corresponding system control processors. For example, the remote access enabled information handling system (130) may include any number of compute/hardware resource sets (132) similar to those described with respect to FIG. 1.2 (and may also include similar or different interconnect fabrics).

To provide the remote access enabled information handling system (130), the remote access enabled information handling system (130) may host a system control processor client (134). The system control processor client (134) may be implemented as a processor adapted to execute computer instructions stored on a non-transitory medium that provide the functionality of the system control processor client (134).

The system control processor client (134) may facilitate access to one or more system control processors. The one or more system control processors may be hosted by a remote device. The system control processor client (134) may be instantiated when, for example, a portion of the compute/hardware resource sets (132) are allocated to a composed information handling system.

Once instantiated, the remote access enabled information handling system (130) may operate as though it also included a control resource set and corresponding system control processors. To do so, the system control processor client (134) may operate as a pass through entity that obtains communications from the compute/hardware resource sets (132) and forwards them to any number of system control processors. The system control processor client (134) may also receive communications from the system control processors and forward them to the compute/hardware resource sets (132). The system control processor client (134) may implement any method of performing these communications without departing from the invention.

In one or more embodiments of the invention, the system control processor client (134) is implemented as a plug-in, agent, client, and/or other entity that manages the operation of the remote access enabled information handling system (130). For example, the system control processor client (134) may operate as a plug-in for an operating system. Consequently, the system control processor client (134), via the operating system, may present resources to resource set components of the compute/hardware resource sets (132) as bare metal devices.

For example, at instantiation time of a composed information handling system, the system control processor client (134) may be instantiated in an operating system and configured to appropriately receive and forward communications from the compute/hardware resource sets (132) to a system control processor that provides access to computing resources, as will be discussed in greater detail with respect to FIG. 3. To facilitate communications, a virtual private network or other communication scheme may be employed to secure communications between the system control processor client (134) and other devices hosting system control processor allocated to the composed information handling system. These communication schemes may utilize network (70) for communications purposes.

While the system control processor client (134) has been described as being implemented using a processor, other types of hardware devices may be used to provide the functionality of the system control processor client (134) without departing from the invention. For example, programmable gate arrays, application specific integrated circuits, a network interface card or other communication capacity that may be programmed or configured, and/or other types of hardware devices with dedicated circuitry may be used to provide the functionality of the system control processor client (134).

While the remote access enabled information handling system (130) of FIG. 1.4 has been illustrated and described as including a limited number of specific components, a remote access enabled information handling system in accordance with embodiments of the invention may include additional, fewer, and/or different components without departing from the invention.

Turning to FIG. 1.5, FIG. 1.5 shows a diagram of a software enabled information handling system (140) in accordance with one or more embodiments of the invention. The software enabled information handling system (140) may provide similar functionality to the information handling system illustrated in FIG. 1.2. However, the software enabled information handling system (140) may not include a control resource set or corresponding system control processors. For example, the software enabled information handling system (140) may host virtual machines (142) that are provided with computing resources via a resource sets manager (146).

The resource sets manager (146) may operate as a hypervisor or other type of resource management entity for managing the allocation of computing resources from compute/hardware resource sets (150). Consequently, the software enabled information handling system (140) may natively be able to provide virtual machines (142) with computing resources of compute/hardware resource sets (150) but not compute resource sets.

To provide the software enabled information handling system (140) with system control processor functionality, the software enabled information handling system (140) may host a system control processor client (148) that enables the resource sets manager (146) to allocate portions of system control processors to the virtual machines (142).

The system control processors may be local (e.g., the virtual system control processors (144) which operate using resources of the compute/hardware resource sets (150) allocated to them) or remote (e.g., physical or virtual system control processors hosted by a remote appliance, as further discussed with respect to FIG. 2).

To the resource sets manager (146), the system control processor client (148) may appear to be a driver or other management entity for a physical device. However, as described with respect to FIG. 1.4, the system control processor client (148) may operate as a pass-through entity that forwards communications directed to it to a system control processor. Consequently, when a resource sets manager (146) allocates resources presented by what would typically be a physical device, the system control processor client (148) may enable virtualized or otherwise abstracted resources to be presented as bare metal resource. For additional details regarding presentation of abstracted resources as bare metal resources, refer to the discussion of FIG. 3.

The virtual machines (142), virtual system control processor (144), resource sets manager (146) and/or system control processor client (148) may be implemented using one or more processors adapted to execute computer instructions stored on a non-transitory medium that provide the functionality of the virtual machines (142), virtual system control processor (144), resource sets manager (146) and/or system control processor client (148). These components may also be implemented using one or more hardware devices such as, for example, programmable gate arrays, application specific integrated circuits, a network interface card or other communication capacity that may be programmed or configured, and/or other types of hardware devices with dedicated circuitry that provides all or a portion of their respective functionalities.

While the software enabled information handling system (140) of FIG. 1.5 has been illustrated and described as including a limited number of specific components, a software enabled information handling system in accordance with embodiments of the invention may include additional, fewer, and/or different components without departing from the invention.

As discussed with respect to the system illustrated in FIGS. 1.4 and 1.5, system control processor functionality may be allocated to information handling systems using virtualized or physical system control processors using remote devices. FIG. 2 shows a diagram of a remote system control processor appliance (25) in accordance with one or more embodiments of the invention.

The remote system control processor appliance (25) may provide other devices with system control processor functionality. Specifically, when a composed information handling system is instantiated, the remote system control processor appliance (25) may enable system control processor functionality to be allocated to a composed information handling system.

To do so, the remote system control processor appliance (25) may host any number of virtual system control processors (200) (e.g., an application that emulates the operation of a physical device) and/or physical system control processors (202). The remote system control processor appliance (25) may host any number and type of these devices (e.g., no virtual system control processors (200) and all physical system control processors (202), all virtual system control processors (200) and no physical system control processors (202), or a mix of some virtual system control processors (200) and some physical system control processors (202).

The remote system control processor appliance (25) may also include compute/hardware resource sets (206) that may provide the virtual system control processors (200) with computing resources necessary for their execution.

While not illustrated in FIG. 2, the remote system control processor appliance (25) may host an agent or other management entity that cooperates with system control processor manager (e.g., 50, FIG. 1.1) during instantiation of composed system. For example, the agent may receive instructions regarding allocations of system control processor, instantiate new instances of virtual system control processors (200), allocate virtual and/or physical system control processors, and/or setup management/coordination services for the allocated system control processors. These management and/or coordination services may include establishing virtual private network or other communications scheme to enable the system control processors and information handling systems to efficiently and securely communicate with one another, may assign identifiers and/or other information for allocation purposes, may configure these system control processors (for additional discussion regarding configuration, structure, and operation of system control processors, refer to FIG. 3), and/or perform other actions necessary to enable information handling systems to utilize system control processors hosted by the remote system control processor appliance (25).

While the remote system control processor appliance (25) of FIG. 2 has been illustrated and described as including a limited number of specific components, a remote system control processor appliance in accordance with embodiments of the invention may include additional, fewer, and/or different components without departing from the invention.

As discussed above, system control processor may be allocated to composed information handling systems. FIG. 3 shows a diagram of a system control processor (298) in accordance with one or more embodiments of the invention. Any of the system control processors (virtual or physical) discussed with respect to FIGS. 1.2-2 may be similar to the system control processor (298) illustrated in FIG. 3. For virtual system control processors, the functionality described with respect to FIG. 3 may be provided by a processor adapted to execute computing instructions stored on a non-transitory computer readable medium.

The system control processor (298) may facilitate instantiation, reallocation of resources to/from composed systems, operation of composed information handling systems, and management of information handling systems by facilitating collection and aggregation of operation data of resource set components. By doing so, a system that includes information handling systems may dynamically instantiate and recompose (e.g., add/remove/replace resources) composed information handling systems to provide computer implemented services.

To instantiate and operate composed information handling systems, the system control processor (298) may include a composition manager (300), a physical resources manager (302), an emulated resources manager (304), a virtual resources manager (306), an operation manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of any number of information handling systems (e.g., obtain telemetry data regarding the information handling system), (ii) provide the obtained information to other entities (e.g., management entities such as system control processor manager (50, FIG. 1.1)), (iii) obtain composition/recomposition requests for composed information handling systems, (iv) based on the composition requests, prepare and present resources as bare metal resources to compute resource sets, (v) setup management services for these allocated resource set components, (vi) instantiate applications in composed information handling systems to cause the composed information handling systems to provide computer implemented services, conform their operation to security models, etc., (vii) add/remove/recompose resources presented to the compute resource sets of composed information handling systems dynamically in accordance with utilization levels of the resources, and/or (viii) coordinate with other system control processors to provide distributed system functionalities and/or transfer performance of applications and/or computer implemented services between composed information handling systems. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory, storages, network interface cards, etc.). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition request (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a composed information handling system.

Figure 5:
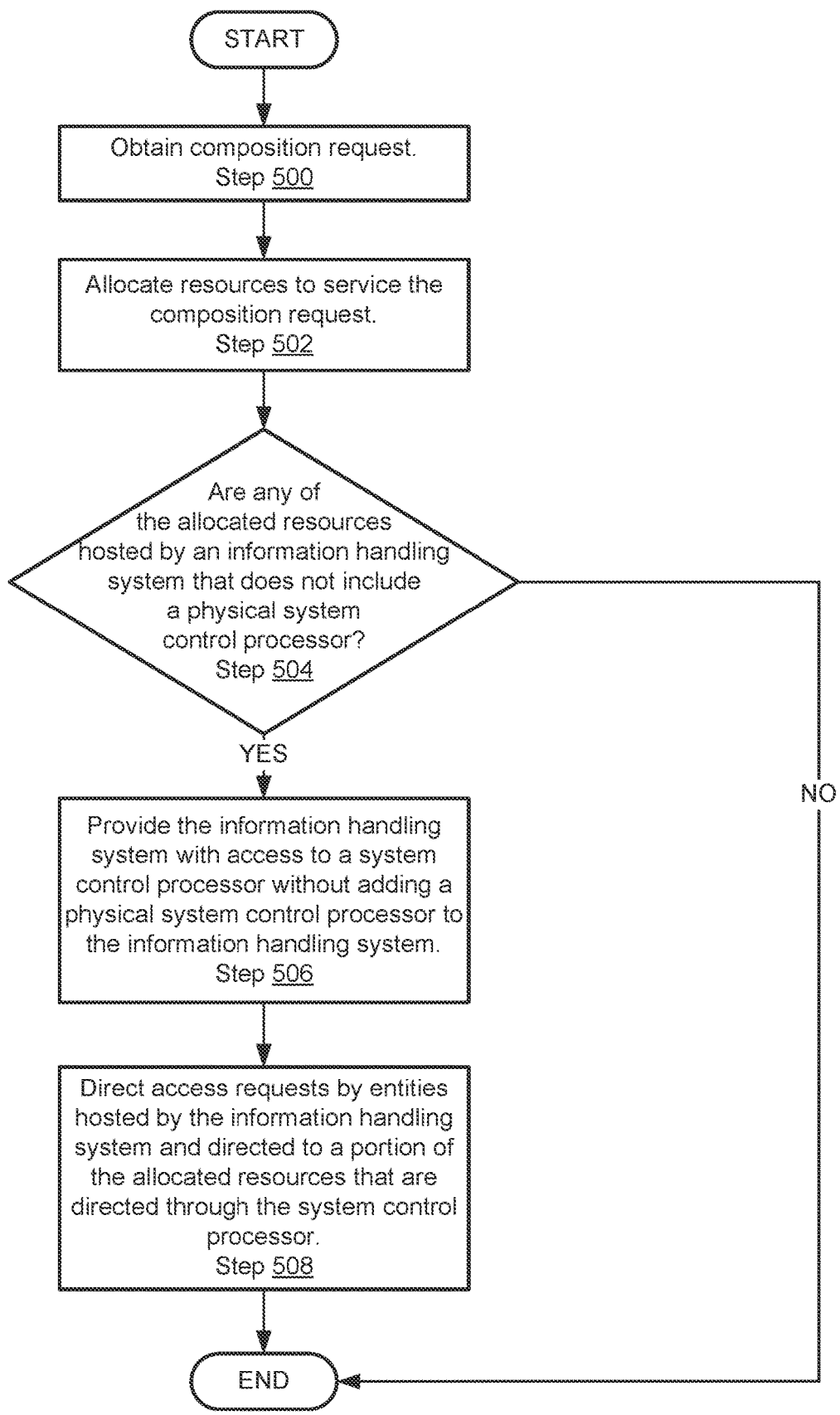
FIG. 5 shows a flowchart of a method of instantiating composed information handling systems in accordance with one or more embodiments of the invention.
Figure 6:
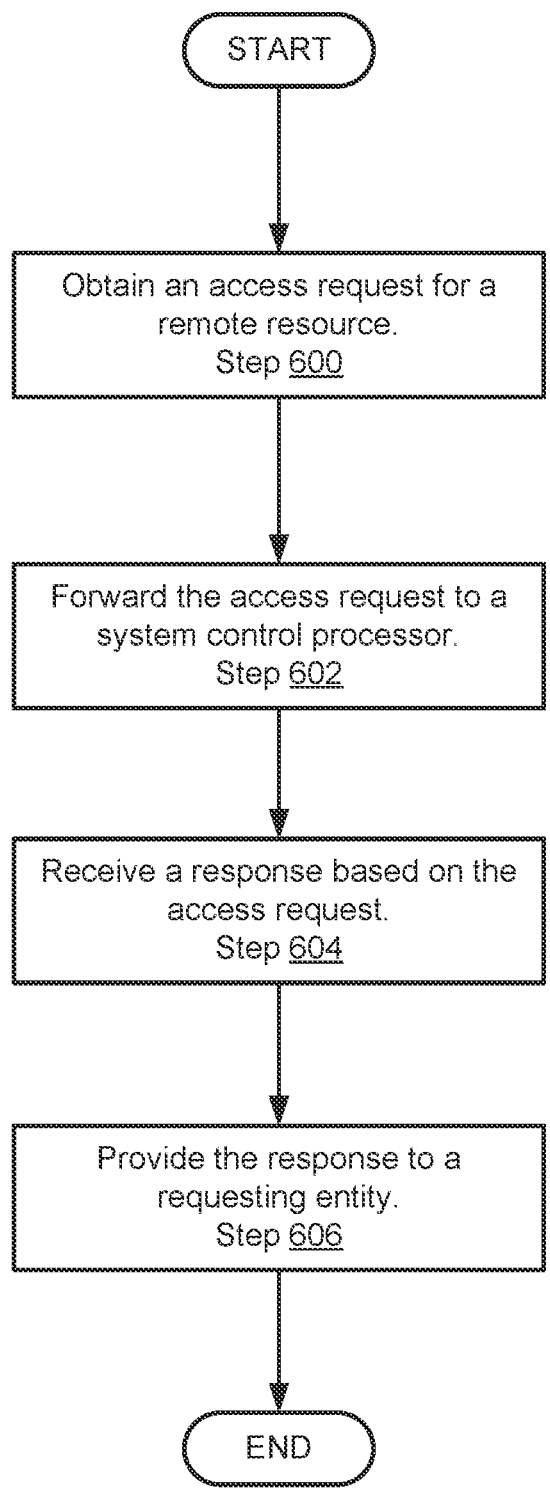
FIG. 6 shows a flowchart of a method of operating composed information handling systems in accordance with one or more embodiments of the invention.

When providing its functionality, the composition manager (300) may perform all, or a portion, of the methods illustrated in FIGS. 5-6.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system(s) allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications (e.g., to obtain address translation tables, emulation tables, etc.).

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding TO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The composition manager (300), physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.2). For example, the hardware resource services (310) may include driver functionality to appropriately communicate with the hardware devices of hardware resource sets. The hardware resource services (310) may be invoked by, for example, the operation manager (308).

In a scenario where a system control processor is remote to a resource set that it is providing management services to or presenting resource to a remote resource set, the hardware resource services (310) may forward communications to a corresponding system control processor or agent/client/other type of entity (e.g., 148, FIG. 1.5). Consequently, the hardware resource services (310) may enable the system control processor (298) to effectively communicate with, manage, and present remote resource sets as bare metal resources to other resource sets (e.g., a remote hardware resources set being present to a compute resource set).

When providing their functionalities, any of the aforementioned components of the system control processor (298) may perform all, or a portion, of the methods illustrated in FIGS. 5-6.

The system control processor (298) may be implemented using computing devices.

The computing devices may be, for example, an embedded computing device such as a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5-6. The system control processor (298) may be implemented using other types of computing devices without departing from the invention. For additional details regarding computing devices, refer to FIG. 8.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

Further, the system control processor (298) may be implemented as a virtualized entity (e.g., hardware device executing software that emulates the operation of a physical device) that provides the same functionality of the system control processor (298), as discussed above.

In one or more embodiments of the invention, any of the composition manager (300), physical resources manager (302), emulated resources manager (304), virtual resources manager (306), operation manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), operation manager (308), and/or hardware resource services (310). The composition manager (300), physical resources manager (302), emulated resources manager (304), virtual resources manager (306), operation manager (308), and/or hardware resource services (310) may be implemented using other types of hardware devices without departing from the invention.

In one or more embodiments of the invention, any of the composition manager (300), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
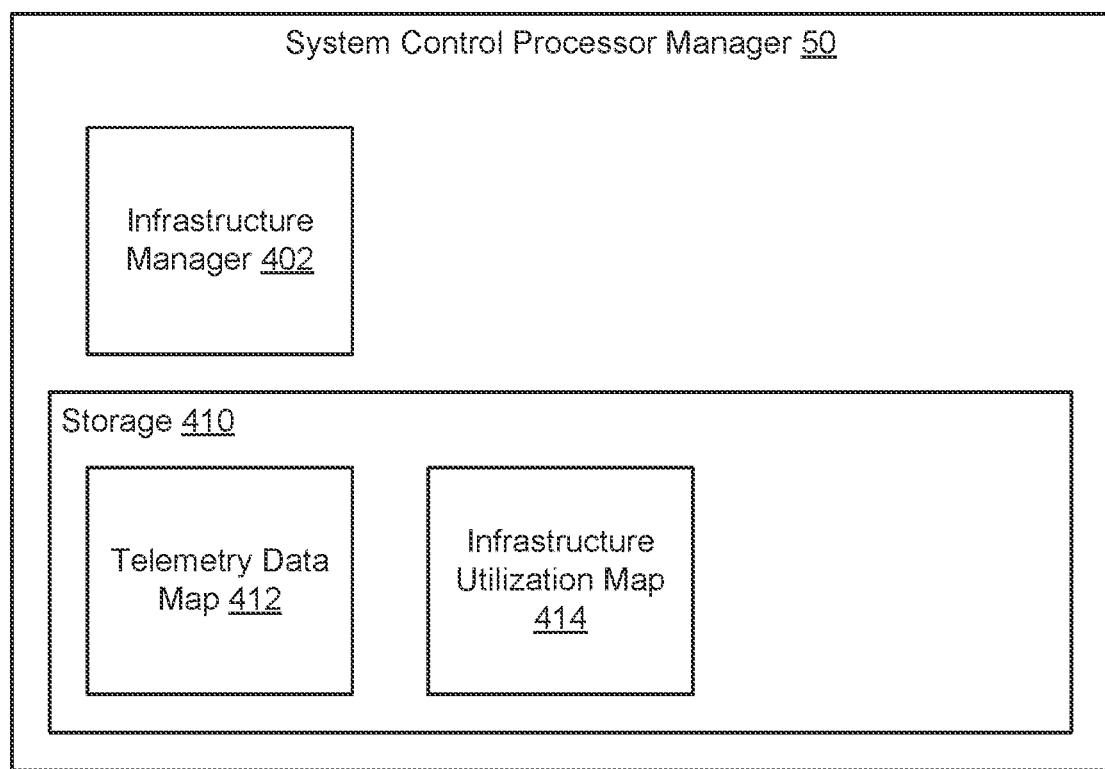
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems and recomposing composed information handling systems over time. To do so, the system control processor manager (50) may include an infrastructure manager (402) and storage (410). Each of these components is discussed below.

The infrastructure manager (402) may provide composition services. Composition services may include obtaining composition/recomposition requests for composed information handling systems, determining the resources to allocate to instantiate composed information handling systems, add/remove resources to recompose composed information handling systems, manage transfers of workloads between composed information handling systems for recomposition purposes, and cooperating with system control processors to allocate the identified resources. By doing so, the infrastructure manager (402) may cause any number of computer implemented services to be provided using the composed information handling systems.

To cooperate with the system control processors for composed information handling system composition and recomposition purposes, the infrastructure manager (402) may obtain telemetry data regarding the computing resources of any number of information handling systems, remote system control processor appliances, and/or external resources that are available for allocation. The infrastructure manager (402) may aggregate this data in a telemetry data map (412), which may be subsequently used to identify resources of any number of information handling systems, remote system control processor appliances, and/or external resources to satisfy composition and/or recomposition requests (e.g., instantiate one or more composed information handling systems to meet the requirements of the composition requests, modify resource allocations to existing composed information handling systems, etc.).

When the infrastructure manager (402) identifies the computing resources to be allocated, the infrastructure manager (402) may communicate with any number of system control processors (e.g., of control resource sets of information handling systems, virtualized system control processors, local or remote) to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

These actions may include any of the processes of establishing layers of abstraction as describe with respect to FIG. 3, establishing communications between devices that are remote to each other, and/or performing other actions that may enable a composed information handling system to be performed by aggregating the operation of any number of resource set components.

As composed information handling systems are instantiated and/or recomposed, the infrastructure manager (402) may add information reflecting the resources allocated to composed information handling systems, the workloads being performed by the composed information handling systems, and/or other types of information to an infrastructure utilization map (414). The infrastructure manager (402) may utilize this information to, for example, decide whether computing resources should be added to or removed from composed information handling system (e.g., whether the computing resources are free for allocation or currently utilized by other entities). Consequently, computing resources may be dynamically re-provisioned.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5-6.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in-line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412) and the infrastructure utilization map (414). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed information handling systems.

Any of these data structures may be implemented using any combination and quantity of, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIG. 5 shows methods that may be performed by components of the system of FIG. 1.1 to manage composed information handling systems.

FIG. 5 shows a flowchart of a method in accordance with one or more embodiments of the invention. The method depicted in FIG. 5 may be performed to instantiate composed information handling systems in accordance with one or more embodiments of the invention. The method shown in FIG. 5 may be performed by, for example, a system control processor manager (e.g., 50, FIG. 1.1). Other components of the system in FIG. 1.1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a composition request is obtained. The composition request may be obtained from a client or another entity. The composition request may request that a new composed information handling system be instantiated or that the quantity of resources allocated to an existing composed information handling system be modified. The requests may be explicit, or intent based.

In step 502, resources to service the composition request are allocated. To allocate the resources, the resources may be identified using a telemetry data map (412, FIG. 4) to identify various resource sets having resources necessary to satisfy the composition request or existing resources already allocated to the composed information handling system that can be deallocated (e.g., depending on the type of request).

In step 504, a determination is made regarding whether any of the allocated resources are hosted by an information handling system that does not include a physical system control processor. The determination may be made using information included in the telemetry data map (e.g., that indicates the components of each information handling system).

In some embodiments of the invention, an information handling system may host a system control processor that does not include required/desired functionality because it is an earlier generation device or otherwise does not include the desired functionality. In such a scenario, the system control processor may treat the information handling system as though it does not host a physical system control processor.

If it is determined that any of the allocated resources are hosted by an information handling system that does not include a physical system control processor, then the method may proceed to step 506. Otherwise, the method may end following step 504.

In step 506, the information handling system is provided with access to a system control processor without adding a physical system control processor to the information handling system. The access may be provided by (i) instantiating a virtualized system control processor in the information handling system, (ii) allocating a physical system control processor hosted by a remote device to the information handling system, and/or by (iii) allocating a virtualized system control processor hosted by a remote device.

For example, a system control processor hosted by a remote system control processor appliance may be allocated to the information handling system. Once a remote system control processor is allocated, management services such as communication services (e.g., establishing a virtual private network) between the information handling system and the host device may be established thereby placing the allocated system control processor in communication with resource sets hosted by the information handling system.

In another example, a virtual system control processor is instantiated in the information handling system. For example, a request for instantiation may be sent to the information handling system, a resources manager may allocate resources for the virtualized system control processor, and a new processes corresponding to the virtual system control processor may be instantiated and executed using the resources allocated by the resources manager. After being instantiated, the virtual system control processor may be connected to the information handling system via a logical network interface or other communications system. Alternatively, the virtual system control processor may be instantiated in another device (e.g., another information handling system). The device may be a remote system control processor appliance that hosts any number of virtual system control processors allocated to any number of information handling systems. The resulting virtualized system control processor may present various resource sets to other resources sets as bare metal resources even though the virtualized system control processors are managing the resource sets using abstraction.

When a system control processor is allocated to an information handling system, the system control processor may be provided with identification information with resource sets that it will manage and present managed resource to. The system control processors may then take action to manage the resources and presentation of the resources. For example, the system control processor may manage a hardware resource set that includes a data storage devices by virtualizing the storage resources into two disks and may present only one of the virtualized disks as bare metal resources to a compute resource set that includes a processor and memory thereby forming a composed information handling system.

In step 508, access requests by entities hosted by the information handling system and directed to a portion of the allocated resources that are accessed through the allocated system control processor. The access requests may be directed by instantiating a system control processor client in the information handling system. The instantiated system control processor client may direct the communications to the allocated system control processor via the communication services.

The method may end following step 508.

Using the method illustrated in FIG. 5, composed information handling systems may be formed using information handling systems that do not include system control processors.

Turning to FIG. 6, after a composed information handling system is instantiated using an information handling system that does not include a system control processor, the information handling system may use a virtualized and/or remote system control processor in its operation. The method illustrated in FIG. 6 may be performed when operating an information handling system that does not include a system control processor as part of a composed information handling system.

FIG. 6 shows a flowchart of a method in accordance with one or more embodiments of the invention. The method depicted in FIG. 6 may be performed to service an access request in a composed information handling system in accordance with one or more embodiments of the invention. The method shown in FIG. 6 may be performed by, for example, a system control processor client (e.g., 134, FIG. 1.4). Other components of the system in FIG. 1.1 may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

In step 600, an access request for a remote resource is obtained. The remote resource may be managed by a system control processor associated with the system control processor client.

For example, consider a scenario where a composed system is formed using a first information handling system that does not host a control resource set. When the composed information handling system is instantiated, a system control processor client for a remote system control processor may be instantiated. The system control processor client may operate as though it were a driver or other entity tasked with managing communications between the remote resource, managed by the remote system control processor, and resource sets of the information handling system. Consequently, when a processor or other devices needs to communicate with the remote resource, the communications may be routed to the system control processor client which then passes the communications to the remote system control processor. In turn, the remote system control processor may service instructions included in the communications.

In step 602, the access request is forwarded to a system control processor. The access request may be forwarded via, for example, a virtual private network or other method of communicating with a remote system control processor. The system control processor may be hosted by another device (e.g., an appliance, other information handling system, etc.)) or may appear as a remote device by virtue of being hosted by a local virtual machine (e.g., or by direct emulation as a virtual system control processor on the information handling system).

Once the access request is sent to the system control processor, the system control processor may service the access request. The access request may request any operation supported by a type of device being presented by the system control processor as bare metal resources. For example, if the system control processor is presenting resources as a storage device, the access request may include data storage/access requests.

In another example, if the system control processor is presenting resources as a graphics processing unit, the access request may specify a workload to be performed by the graphics processing unit.

In step 604, a response based on the access request is received. As noted above, the system control processor may process the access request and generate a corresponding response (e.g., acknowledgement of completing an operation, returning desired/requested data, etc.). Once the response is generated, the system control processor may provide the response to the system control processor client hosted by the information handling system.

In step 606, the response is provided to a requesting entity. In other words, an entity that initiated, generated, or otherwise requested that the access request be serviced.

The method may end following step 606.

Using the method illustrated in FIG. 6, composed information handling systems that include information handling systems that do not include physical system control processors utilize system control processor functionality. Consequently, the information handling system may operate as though that included system control processors.

Figure 7:
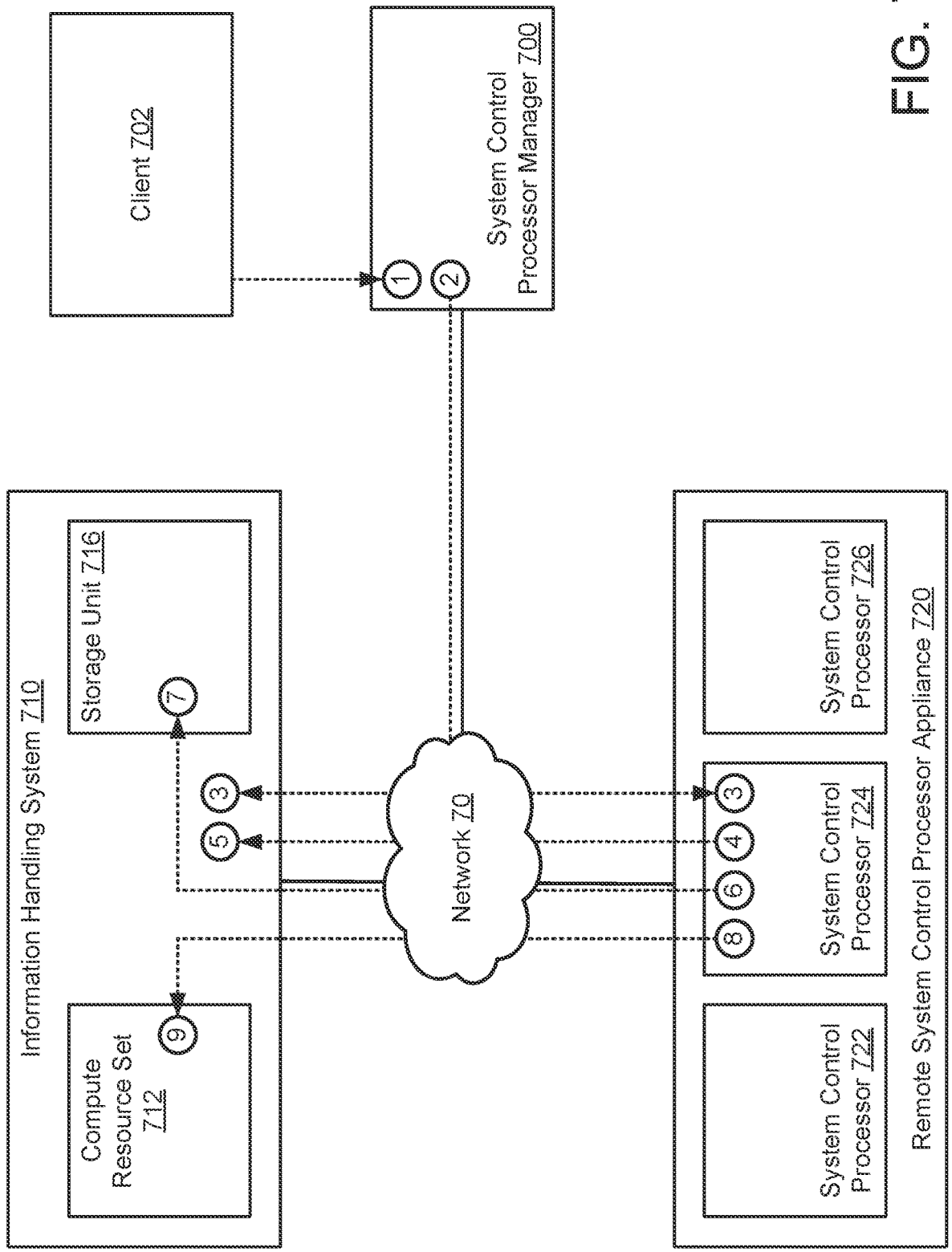
FIG. 7 shows a diagram illustrating the operation of an example system over time in accordance with one or more embodiments of the invention.

To further clarify embodiments of the invention, a non-limiting example is provided in FIG. 7. FIG. 7 illustrate a system similar to that illustrated in FIG. 1.1. Actions performed by components of the system are illustrated by numbered, circular boxes interconnected, in part, using dashed lines terminating in arrows. For the sake of brevity, only a limited number of components of the system of FIG. 1.1 is illustrated in FIG. 7.

EXAMPLE

Consider a scenario as illustrated in FIG. 7 in which client (702) is tasked with managing data in a database. Due to the importance of the information in the database, the client (702) is instructed to keep at least one backup of the data at all points in time.

To ensure that backups for the data are available, the client (702) send, at step 1, a composition request to a system control processor manager (700) that manages composition of composed information handling systems using an information handling system (710) and a remote system control processor appliance (720).

In response to the composition request, the system control processor manager (700) reviews its telemetry information regarding the information handling system (710) and the remote system control processor appliance (720). Based on the review, the system control processor manager (700) identified that the information handling system (710) lacked a system control processor but that the remote system control processor appliance (720) had three system control processors (722, 724, 726) available for allocation.

Based on this information, the system control processor manager (700), at step 2, made the determination that a compute resource set (712), storage unit (716), and system control processor (724) should be allocated to a new composed information handling system which will provide backup services for the client (702). Accordingly, at step 3, the system control processor manager (700) sent (i) instructions to the information handling system (710) to instantiate a system control processor client for the system control processor (724) and (ii) instructions to the system control processor (724) to manage the storage unit (716) in accordance with a data storage model and to present the abstracted storage resources of the storage unit (716) to the compute resource set (712) as bare metal resources.

In response to the instructions, the information handling system (710) instantiated the system control processor client (not shown). At step 4, the system control processor (724) sent instructions to the information handling system (710) to setup a virtual private network via network (70) with the system control processor (724) via the remote system control processor appliance (720). In response, at step 5, the information handling system (710) setup appropriate virtual interfaces, routing tables, and/or other configuration actions required to setup the virtual private network.

In step 6, the system control processor (724) prepared to allocate the storage unit (716) by setting up appropriate layers of abstraction, virtualization, and instantiated a storage management entity for providing backup services to the client (702).

At step 7, the system control processor (724), via the system control processor client hosted by the information handling system (710), configured the storage unit (716) by organizing its storage resources in accordance with the storage mode.

At step 8, the system control processor (724) prepared the organized resources for presentation to the compute resource set (712). To do so, the system control processor (724) updated its management data (e.g., allocations). At step 9 and in response to a discovery initiated by the compute resource set (e.g., during a boot), the system control processor (724) presents the abstracted storage resources of the storage unit (716) as bare metal resources to the compute resource set (712).

At this point, a composed information handling system has been formed which is able to provide backup services to the client (702). To provide the backup services, the compute resource set (712) may issue data storage/access requests which are routed, via the system control processor client, to the system control processor (724). The system control processor (724) may then service the storage/access requests using the storage unit (716) in accordance with its abstraction layers and data storage model.

For example, the system control processor (724) may automatically deduplicate to-be-stored data, may index data, may initiate backup generations, and/or may take other actions in addition to servicing the storage/access requests thereby forming a backup system capable of servicing the needs of the client (702) without requiring the compute resource set (712) to manage the abstraction.

End of Example

Figure 8:
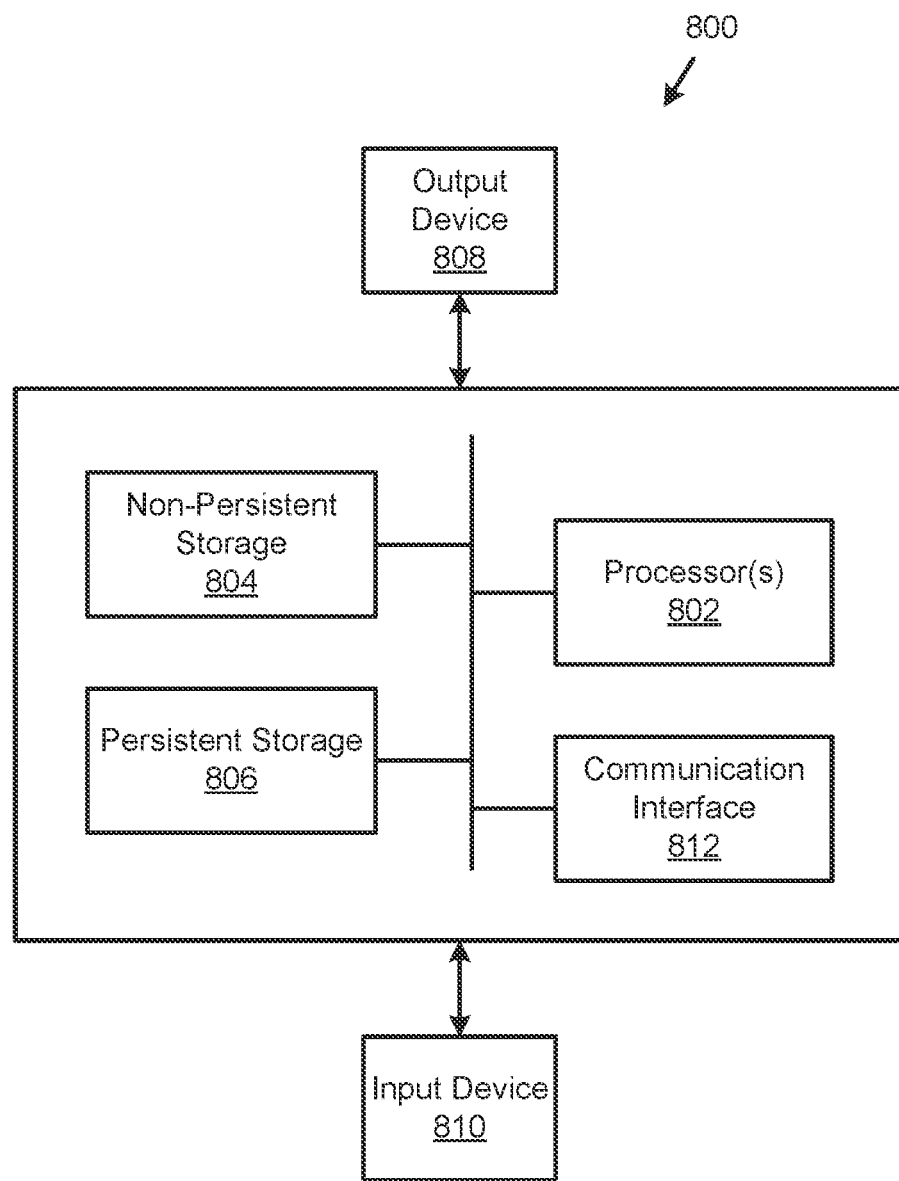
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may provide a system and method for providing computer implemented services using information handling systems. Specifically, embodiments of the invention may enable information handling systems that do not natively include system control processors to be formed into composed information handling systems. To do so, system control processor functionality may be allocated to the information handling systems by (i) instantiating a virtualized system control processor locally on the information handling system, (ii) instantiating a virtualized system control processor remotely on another device, or (iii) allocating a remote system control processor to the information handling system. Additionally, a system control processor client may be instantiated on the information handling system to facilitate communications between the resources of the information handling system and the allocated system control processor. By doing so, system control processor functionality may be provided an information handling system.

Thus, embodiments of the invention may address the problem of limited resources availability. Specifically, embodiments of the invention may provide for the allocation of new capabilities to systems that lack the capabilities. By doing so, information handling systems that lack system control processor functionality may still be utilized to instantiate composed systems.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A system control processor manager for providing computer implemented services using composed information handling systems that utilize resource sets of information handling systems, comprising:
    storage for storing a telemetry data map of the resource sets of the information handling systems; and
    an infrastructure manager programmed to:
        obtain a composition request for a composed information handling system;
        allocate, in response to the composition request, a portion of the resource sets to the composed information handling system using the telemetry data map,
        wherein second resource sets of a first information handling system comprise a compute resource set comprising a physical processor and a hardware resource set comprising a hardware storage device and a hardware memory device,
        wherein third resource sets of a second information handling system comprise a second compute resource set, a second hardware resource set, and a control resource set comprising a physical system control processor,
        wherein the second resource sets do not comprise a second control resource set, wherein the physical system control processor connects to the second compute resource set via a compute resource interface and connects to the second hardware resource set via a hardware resource interface;
make a determination that the hardware resource set allocated to the composed information handling system is hosted by the first information handling system of the information handling systems that does not include any physical system control processor, wherein the first information handling system comprises a system control processor client; and
in response to the determination:
provide the composed information handling system with access to the physical system control processor without adding any physical system control processors to the first information handling system, wherein the providing comprises:
allocating the physical system control processor being part of the control resource set hosted on the second information handling system to the composed information handling system,
wherein the second information handling system further hosts a processor being part of the second compute resource set allocated to the composed information handling system,
wherein the physical system control processor comprises a set of hardware resource services,
wherein the set of hardware resource services communicate with the system control processor client to present the allocated hardware resource set to the processor as bare metal resources; and
direct access requests, by entities hosted by the first information handling system and directed to the portion of the allocated resource sets, through the physical system control processor.

2. A method for providing computer implemented services using composed information handling systems that utilize resource sets of information handling systems, comprising:
obtaining a composition request for a composed information handling system;
allocating, in response to the composition request, a portion of the resource sets to the composed information handling system using a telemetry data map,
wherein second resource sets of a first information handling system comprise a compute resource set comprising a physical processor and a hardware resource set comprising a hardware storage device and a hardware memory device,
wherein third resource sets of a second information handling system comprise a second compute resource set, a second hardware resource set, and a control resource set comprising a physical system control processor,
wherein the second resource sets do not comprise a second control resource set,
wherein the physical system control processor connects to the second compute resource set via a compute resource interface and connects to the second hardware resource set via a hardware resource interface;
making a determination that the hardware resource set allocated to the composed information handling system is hosted by the first information handling system of the information handling systems that does not include any physical system control processor, wherein the first information handling system comprises a system control processor client; and in response to the determination:
providing the composed information handling system with access to the physical system control processor without adding any physical system control processors to the first information handling system, wherein the providing comprises:
allocating the physical system control processor being part of the control resource set hosted on the second information handling system to the composed information handling system,
wherein the second information handling system further hosts a processor being part of the second compute resource set allocated to the composed information handling system,
wherein the physical system control processor comprises a set of hardware resource services,
wherein the set of hardware resource services communicate with the system control processor client to present the allocated hardware resource set to the processor as bare metal resources; and
directing access requests by entities hosted by the first information handling system and directed to the portion of the allocated resource sets, through the physical system control processor.

3. A non-transitory computer readable medium comprising computer readable program code, which when executed by a computer processor enables the computer processor to perform a method for providing computer implemented services using composed information handling systems that utilize resource sets of information handling systems, the method comprising:
obtaining a composition request for a composed information handling system;
allocating, in response to the composition request, a portion of the resource sets to the composed information handling system using a telemetry data map,
wherein second resource sets of a first information handling system comprise a compute resource set comprising a physical processor and a hardware resource set comprising a hardware storage device and a hardware memory device,
wherein third resource sets of a second information handling system comprise a second compute resource set, a second hardware resource set, and a control resource set comprising a physical system control processor,
wherein the second resource sets do not comprise a second control resource set,
wherein the physical system control processor connects to the second compute resource set via a compute resource interface and connects to the second hardware resource set via a hardware resource interface;
making a determination that the hardware resource set allocated to the composed information handling system is hosted by the first information handling system of the information handling systems that does not include any physical system control processor, wherein the first information handling system comprises a system control processor client; and
in response to the determination:
providing the composed information handling system with access to the physical system control processor without adding any physical system control processors to the first information handling system, comprising:
allocating the physical system control processor being part of the control resource set hosted on the second information handling system to the composed information handling system, wherein the second information handling system further hosts a processor being part of the second compute resource set allocated to the composed information handling system, wherein the physical system control processor comprises a set of hardware resource services, wherein the set of hardware resource services communicate with the system control processor client to present the allocated hardware resource set to the processor as bare metal resources; and directing access requests by entities hosted by the first information handling system and directed to the portion of the allocated resource sets, through the physical system control processor.

* * * * *